(12) United States Patent
Larock et al.

(10) Patent No.: US 6,211,315 B1
(45) Date of Patent: Apr. 3, 2001

(54) LEWIS ACID-CATALYZED POLYMERIZATION OF BIOLOGICAL OILS AND RESULTING POLYMERIC MATERIALS

(75) Inventors: Richard C. Larock, Ames, IA (US); Mark Hanson, West Lafayette, IN (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/190,056

(22) Filed: Nov. 12, 1998

(51) Int. Cl.$^7$ ................................. C08F 1/00; C08F 4/06; C08G 63/00
(52) U.S. Cl. ................. 526/238.3; 526/93; 527/300; 527/305; 527/311; 521/84.1; 521/151
(58) Field of Search ................... 526/238.3, 93; 527/305, 311, 300; 521/84.1, 151

(56) References Cited

U.S. PATENT DOCUMENTS 4,382,136 * 5/1983 Blount ................................. 527/305
5,728,917 * 3/1998 Grubbs et al. ...................... 585/653

FOREIGN PATENT DOCUMENTS

1083516 * 9/1967 (GB) .
1570740 * 9/1967 (DE) .

OTHER PUBLICATIONS

E. H. Pryde, "Nonfood Uses For Soybean Oil," Chapter 21, pp. 458–481.
F.D. Gunstone, "Nonfood Uses of Vegetable Oils and Their Fatty Acids," *Industrial Uses Of Soy Oil For Tomorrow*, P. 17–31 (1995).

Robert W. Johnson, "Polymerization of Fatty Acids," *Fatty Acids in Industry*, pp. 153–175 (1989).

Herman Aage Enemark, "The Making of Plastics from Soybean Oil," Iowa State College, P. 18, 19, 29, 30, (1935).

Printing Ink and Coating Technical Advisory Panels, Chicago, IL, "Preparation of New Oils and Polymers from Soybean Oil," Richard C. Larock, Sep. 15, 1997 and Sep. 16, 1997.

Herman Aage Enemark, "The Making of Platics from Soybean Oil," Iowa State College (1935).

* cited by examiner

*Primary Examiner*—David W. Wu
*Assistant Examiner*—Tanya Zalukaeva
(74) *Attorney, Agent, or Firm*—Dickstein Shapiro Morin & Oshinsky LLP

(57) ABSTRACT

Biological oils, conjugated biological oils, and metathesized or cometathesized biological oils are polymerized or co-polymerized faith divinylbenzene, norboradiene and dicyclopentadiene using a $BF_3.OEt_2$ initiator to provide plastics from renewable resources. The products are thermosetting polymers having highly crosslinked structures, room temperature modulus of about $10^9$ Pa, and excellent thermal stability, making the products useful for applications where current biodegradable plastics are not useable.

58 Claims, 8 Drawing Sheets

DMA THERMOGRAPHS FOR CONJUGATED FISH OIL PRODUCT AND COMMERCIAL POLYMERS

DMA THERMOGRAPHS FOR FISH OIL AND CONJUGATED FISH OIL POLYMERS

DMA THERMOGRAPHS FOR CONJUGATED FISH OIL POLYMERS WITH VARIOUS COMONOMER AMOUNTS

UN-REACTED OIL FRACTIONS IN THE FISH OIL AND CONJUGATED FISH OIL BULK POLYMERS

INCORPORATED OIL FRACTIONS IN THE FISH OIL AND CONJUGATED FISH OIL BULK POLYMERS

TGA THERMOGRAPHS FOR CONJUGATED FISH OIL POLYMERS

TEMPERATURES AT 5% WEIGHT LOSS FOR FISH OIL POLYMERS

TEMPERATURES AT 5% WEIGHT LOSS FOR CONJUGATED FISH OIL POLYMERS

LEWIS ACID-CATALYZED POLYMERIZATION OF BIOLOGICAL OILS AND RESULTING POLYMERIC MATERIALS

FIELD OF THE INVENTION

This invention relates generally to the synthesis of thermoset plastics from biological oils. Particularly, this invention relates to polymerization of biological oils, such as soybean oil and fish oil, and to copolymerization of these oils with various olefins, to produce plastics from renewable resources.

BACKGROUND OF THE INVENTION

The natural environment is being overwhelmed by non-biodegradable, petroleum-based polymeric materials. The ever-increasing demand for such materials has increased dependence on petroleum products and left landfills overflowing with non-renewable, indestructible materials. The great current interest in cheap, biodegradable polymeric materials has recently encouraged the development of such materials from readily available, inexpensive natural sources, such as carbohydrates, starches and proteins, but relatively little work has been done on the conversion of fats and oils to such materials. The development of polymeric materials from biological oils, such as vegetable and fish oils, could dramatically expand and diversify the market for biological oils, while also improving the environment and reducing dependence on petroleum products.

Vegetable oils and fish oils are readily available in large quantities throughout the world. Of all biological oils, soybean oil is probably the most preferable oil for industrial use because it is inexpensive and produced in extremely large volume.

Soybean oil is principally composed of three unsaturated fatty acids: oleic acid, linoleic acid (also called linolic acid), and linolenic acid. These three fatty acids are the primary unsaturated fatty acids found in vegetable oils. Palmitoleic acid is primarily derived from fish oil. Arachidonic acid is primarily derived from animal sources. These five fatty acids comprise the major unsaturated fatty acids of commercial value. The structures of these fatty acids are shown below:

| | |
|---|---|
| $CH_3(CH_2)_5CH=CH(CH_2)_7CO_2H$ | palmitoleic acid |
| $CH_3(CH_2)_7CH=CH(CH_2)_7CO_2H$ | oleic acid |
| $CH_3(CH_2)_4CH=CHCH_2CH=CH(CH_2)_7CO_2H$ | linoleic acid |
| $CH_3CH_2CH=CHCH_2CH=CHCH_2CH=CH(CH_2)_7CO_2H$ | linolenic acid |
| $CH_3(CH_2)_4(CH=CHCH_2)_4(CH_2)_2CO_2H$ | arachidonic acid |

The fatty acids typically occur in nature as esters, the carboxylic hydrogen being replaced by, for example, a methyl group, ethylene glycol, or glycerol.

Fish oil is a by-product of the production of fish meal. Fish oil has a triglyceride structure with a high percentage of polyunsaturated ω-3 fatty acid side chains, which contain 5–7 non-conjugated c—c double bonds. Chemical analysis indicates that fish oil is a mixture of primarily three key structures:

docosa-4,7,10,13,16,19-hexaenoic acid (DHA, 24.72%);
eicosa-5,8,11,14,17-pentaenoic acid (EPA, 31.68%) and
docosa-7,10,13,16,19-pentacnoic acid (DPA, 4.27%).

This high degree of unsaturation has prompted researchers to examine fish oil as a potential monomer for polymerization or co-polymerization. The reports that have appeared in the literature typically refer to the production of viscous oils.

Very short oligomers such as dimers and trimers have been produced from soybean oil using thermal polymerization processes, as described by R. W. Johnson, et al., *Polymerization of Fatty Acids,* Fatty Acids in Industry 153–75 (1989). However, these processes are poorly controllable. In addition, the processes produce mainly dimers and trimers, and tend to destroy carbon-carbon double bonds.

What is needed is a process capable of polymerizing the unsaturated fatty acids in biological oils to produce useful plastic materials. Also needed is a process that can produce a high yield of product with a small catalyst load in a controlled process that minimizes the use of non-renewable, environmentally harmful materials.

SUMMARY OF THE INVENTION

The present invention provides a process for polymerizing biological oils to provide plastics from renewable resources. The invention also provides various end use products, such as molded articles, and composites, containing thermoset plastics derived from fish oil, soybean oil, and other biological oils.

To achieve the objects and in accordance with the purpose of the invention, as embodied and broadly described herein, the present invention provides methods for preparing plastics by polymerizing unsaturated fatty acid esters via Lewis-acid catalysis. The unsaturated fatty acid esters are esters of acids commonly found in biological oils, such as palmitoleic acid, oleic acid, linoleic acid, linolenic acid or arachidonic acid. Preferably, a natural or modified soybean oil, fish oil, or other biological oil containing one or more unsaturated fatty acid esters, is used.

Methods for Lewis-acid catalyzed copolymerization of unsaturated fatty acid esters and an olefin, and including the copolymerization of two or more olefins and a biological oil, are also provided. The preferred olefin comonomers include divinylbenzene, norbornadiene and dicyclopentadiene. In a particularly preferred embodiment, a natural biological oil is modified prior to the Lewis-acid catalyzed copolymerization by one or more of a variety of suitable modification processes, including conjugation, metathesis, or cometathesis.

According to particularly preferred aspects of the invention, thermoset plastics are obtained by conjugating a natural biological oil, or by metathesizing or cometathesizing such oils with additional olefins such as norbornadiene, and copolymerizing the conjugated, metathesized or cometathesized oil with a small quantity of an additional olefin via Lewis-acid catalysis. The preferred Lewis-acid catalyst is boron trifluoride diethyl etherate. The resulting plastic materials are solid thermoset plastics suitable for a wide variety of industrial uses. Among the plastics made by the processes described herein are many plastics which are expected to be biodegradeable.

The invention provides environmentally acceptable substitutes for polyethelene, various consumer and industrial products containing biological oil thermoset plastics, and composites containing such plastics. In particular, the invention provides plastic materials for the medical, agricultural, and packaging industries, molded articles and composite materials for, such as, the marine, aerospace, automobile, and sporting goods industries, construction materials, such as engineering plastics, laminates, paints, coatings, resins and adhesives, and biocompatable materials such as surgical implants and prosthesis equipment containing plastics produced by the processes described herein.

DETAILED DESCRIPTION OF THE PREFERRED EMBODIMENTS

Figure 1:
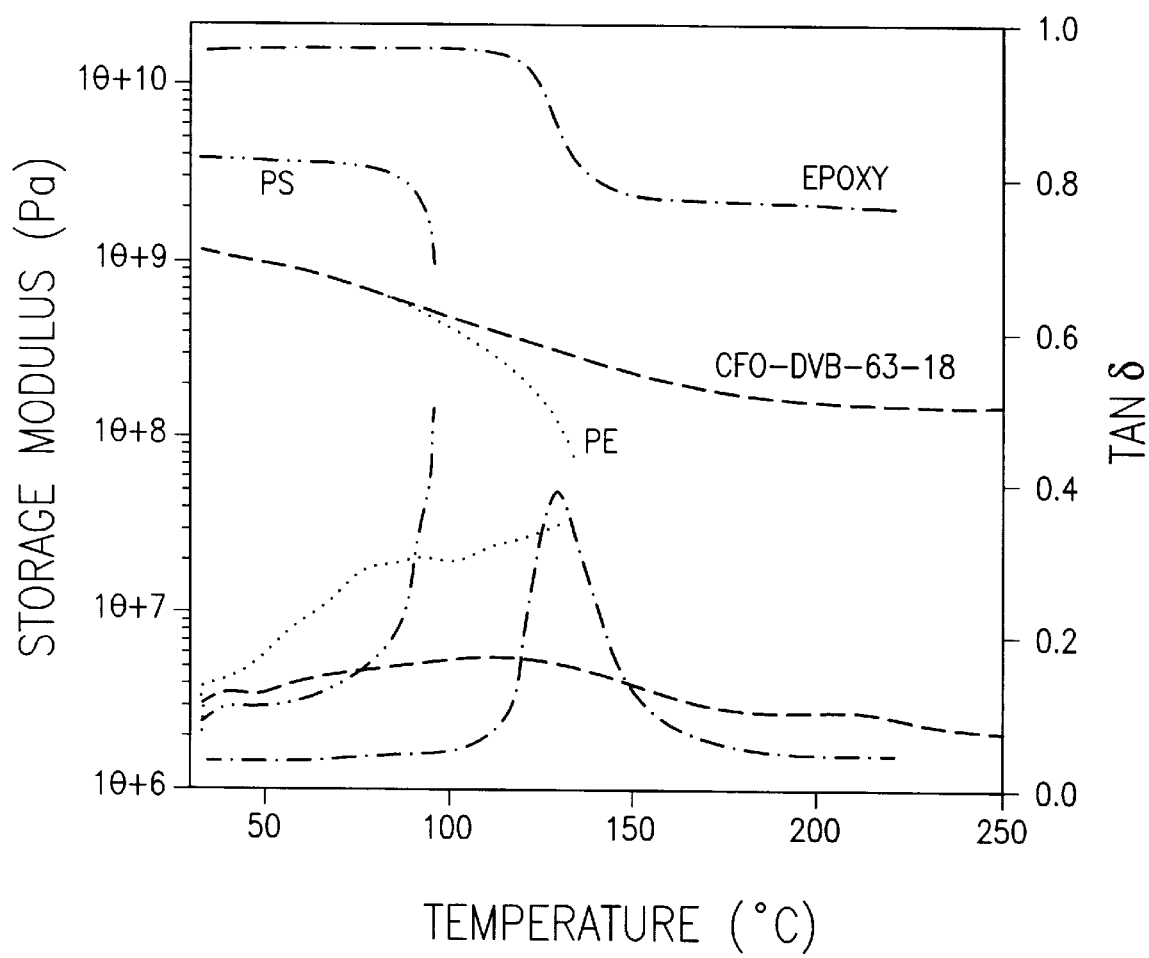
FIG. 1 provides a comparison of the temperature dependence of dynamic mechanical properties of commercial epoxy, commercial styrene, commercial polystyrene, and fish oil plastic according to the present invention.

Reference will now be made in detail to the presently preferred embodiments of the invention, which, together with the following examples, serve to explain the principles of the invention.

Virtually any biological oil can be used as a starting oil in the process of the present invention. "Biological oil", as used herein, shall be understood to mean an oil of animal, fish or vegetable origin, which contains one or more unsaturated fatty acid esters, and excluding oils of a mineral origin, such as petroleum. Examples of usable oils include, but are not limited to, corn, safflower, sunflower, canola, peanut, sesame, palm, coconut, walnut, olive, tung, castor, dehydrated castor, soybean, and fish oils.

The biological oil starting material may be used in an unprocessed (crude) state, or may be processed either commercially or in the laboratory. Commercially processed oils sold under the WESSON, CRISCO and NEW HORIZON brand names are all suitable for carrying out the process of the invention. Fish oil sources include, for example, Norway fish oil, as supplied by Pronova Biocare (Bergen, Norway) and Capelin fish oil, as supplied by SR-Mjol HF (Reykjavik, Iceland). The various biological oil starting materials may be processed in the laboratory before Lewis-acid catalysis by, for example, transesterification, chromatography, purification, conjugation, epoxidation, metathesis, and cometathesis. Conjugated fish oil and metathesized or cometathesized soy oil are particularly preferred.

The term "biodegradeable" as used herein shall be understood to mean that, as a result of environmental factors, e.g., exposure to microorganisms, insects, sunlight, heat, water, oxygen, wind, wave action, sand, and combinations of one or more of these factors, the materials decompose, degrade or erode in the ambient environment or in landfill conditions to a significantly greater extent or at a greater rate than polyethelene or various other commercially available petroleum based plastic materials.

The general method of carrying out the Lewis-acid catalysis polymerization process of the invention is described as follows. In a typical reaction, a vessel is charged with the natural or modified biological oil, preferably a soybean or fish oil that has previously been conjugated, metathesized or cometathesized (as described below) to enhance the Lewis-acid catalyzed polymerization reaction rate and yield. Preferably, one or more olefinic comonomers is also charged to the vessel and thoroughly mixed with the biological oil. The olefinic comonomers may be provided in any desired amount, although 5 to 35 weight percent is preferred, depending on the particular comonomers and also depending upon the starting biological oil. If the biological oil is conjugated or metathesized, useful plastics may be obtained with no or very minimal amounts of olefin comonomers.

Any olefin may be used in the Lewis-acid catalyzed copolymerization process of the present invention. Thermoset plastics have been produced with structurally diverse olefins, including acyclic alkenes, as well as cyclic alkenes, including diallyl phthalate, dicyclopentadiene and norbornadiene. In addition, two or more biological oils may be copolymerized by the process of the present invention. In a particularly preferred embodiment, the biological oil is a mixture of about 5 to 10% fish oil and about 90 to 95% soy oil.

Various comonomers can be polymerized with the biological oil starting materials. These comonomers include, for example, styrene, divinylbenzene, diisopropenylbenzene, norbornadiene, norbornene, dicyclopentadiene, α-methylstyrene, isoprene, myrcene, 1,1-dichloroethene, linalool, phenol, cyclopentadiene, 1,3-di-(2-propenyl) benzene, dipentene, 1,1-diphenylethene, 2,5-dimethylhexa-2,5-diene, ethyl-2-carboethoxy-3-methyl-2-butenoate, ethylvinyl ether, 4-vinyl cyclohexene, ethyl acrylate, acrylonitrile, diallyl terephthalate, diallyl phthalate, furan, p-benzoquinone and p-mentha-1,8-diene. The preferred comonomers include divinylbenzene, norbornadiene, dicyclopentadiene, styrene, α-methylstyrene, furfural, p-benzoquinone, p-mentha-1,8-diene, and furan.

The reaction vessel is then charged with a Lewis-acid catalyst. The reaction can be carried out with various catalyst amounts, preferably between about 1% and 7%, more preferably between about 2% and 5%, by weight of the reaction mixture. $SnCl_4$, $AlCl_3$, $ZnCl_2$, $FeCl_3$, $BCl_3$ and various other suitable Lewis-acid catalysts may be used. The most preferred catalyst, however, is boron trifluoride diethyl etherate ($BF_3.OEt_2$). The Lewis-acid catalyst is typically added via either a gas tight syringe or cannula, depending on the amount. The oil/comonomer/catalyst mixture is then agitated to ensure homogeneity.

The reaction vessel is then subjected to reaction conditions. The reaction may be carried out at any temperature within the range of about 100 to 125° C., but is preferably carried out within the range of 25° C. to 110° C. A most preferred range is 60° C. to 110° C. The reaction is allowed to proceed for sufficient time to allow the formation of a thermoset plastic product. This time is generally within the range of about 22 h to 96 h, but can be as short as about 1 h.

Any suitable method for removing unreacted substances to form a separated insoluble plastic material from the bulk reaction product may be used, if desired. A preferred method is the addition of a solvent that dissolves the unreacted substances. The Lewis-acid catalysis reaction product typically comprises 60–80% of an insoluble thermoset material which is insoluble in $CH_2Cl_2$, THF and DMF solvents. Preferred solvents include $CH_2Cl_2$ and tetrahydrofuran (THF). The insoluble plastic component may be extracted by Soxhlet extraction techniques using methylene chloride as a refluxing solvent.

The Lewis-acid catalysis typically provides quantitative yields. The resulting bulk thermosets possess good thermal stability. A thermogravimetric analysis ("TGA") 5% weight loss is typically noted between 200–270° C. and 10% weight loss is typically noted between 250–330° C. for the bulk reaction product. The THF and $CH_2Cl_2$ insoluble materials typically have TGA 5% weight loss at 350–375° C. and a 10% weight loss at typically about 420° C. The DSC analysis of both the bulk biological oil thermosets and the insoluble materials left behind after extraction of the insoluble oil polymers indicates that these materials are highly crosslinked.

Natural biological oils are preferably modified prior to Lewis-acid catalysis by a suitable conjugation or metathesis process. When conjugated or metathesized oil is used in the Lewis-acid catalysis reactions, harder and shinier plastics are produced. Smaller amounts of alkene additives, such as 0–10% as opposed to 10–30%, are needed to produce rigid thermosets in the conjugated and metathesized oil reactions. Fish oil thermosets prepared using the $BF_3.OEt_2$ chemistry are both harder and less dense than the soybean oil materials prepared using the same chemistry. Preferred conjugation processes are described in copending U.S. Provisional Patent Application Ser. No. 60/080,068, which is hereby incorporated by reference herein in its entirety. In general, the biological oil in EtOH is added to a rhodium catalyst, $SnCl_2.2H_2O$, and $P(p-CH_3C_6H_4)_3$. The reaction mixture is then stirred under an inert atmosphere, such as an $N_2$ blanket, at 60° C. for 24 hours. The resulting solution may be concentrated to an oil and purified by flash chromatography on a silica gel column if desired using a 3:1 hexanes/ethyl acetate eluent or other suitable system. The resulting conjugated biological oil is then used as a modified biological oil starting material in the Lewis-acid catalyzed polymerization process of the invention.

The preferred conjugation catalysts are the Rh complexes $RhCl(PPh_3)_3$ and $[RhCl(C_8H_{14})_2]_2$. 3 mol % $RhCl(PPh_3)_3$ provides conjugated biological oil products in 93% yield at only 60° C. A preferred procedure utilizes 2.5 equivalents of $SnCl_2.2H_2O$ per $RhCl(PPh_3)_3$ at 60° C. in EtOH. In the presence of EtOH, the reaction proceeds at a much lower temperature (60° C. vs 120–150° C.), gives increased conjugation, and avoids generation of hydrogenated products. One mol % of $RhCl(PPh_3)_3$ provides excellent results, and 0.5 mol % $RhCl(PPh_3)_3$ gives only slightly lower yields.

The rhodium complex $[RhCl(C_8H_{14})_2]_2$ is even more preferred than $RhCl(PPh_3)_3$, when combined with $SnCl_2.2H_2O$ and an appropriate phosphine ligand. Various phosphine ligands are suitable and tri-p-tolylphosphine is preferred. The most preferred procedure for the conjugation of biological oil is 0.1 mol % $[RhCl(C_8H_{14})_2]_2$, 0.4 mol % $(p-CH_3C_6H_4)_3P$, 0.8 mol % $SnCl_2.2H_2O$ in EtOH at 60° C. Fish oil, soybean oil, corn oil, sunflower oil, safflower oil, and various other biological oils all provide high yields of conjugated products under these reaction conditions in approximately 24 hours at 60° C.

The preferred method of carrying out metathesis, for pre-processing of biological oils prior to Lewis-acid catalysis, is described in copending U.S. patent application Ser. No. 09/075,326, which is hereby incorporated by reference herein in its entirety. "Metathesis", as used herein, shall be understood to mean the reaction of two alkenes, at least one of which is an unsaturated fatty acid ester, to form two new alkenes. The two reactants may be the same compound, or they may be different compounds, in which case the process is sometimes referred to more specifically as "cometathesis". The metathesis reaction is generally carried out in a reduced oxygen atmosphere, and preferably in an inert atmosphere. The reaction may be carried out at atmospheric pressure, but is preferably conducted at less than 1 atmosphere.

In a typical metathesis reaction, a catalyst vessel is charged with a ruthenium catalyst, most preferably bis (tricyclohexylphosphine) benzylidene ruthenium dichloride, inside a nitrogen-filled glove box before being connected to a dual line Schlenk system with vacuum and argon capabilities. Other preferred ruthenium catalysts include ruthenium complexes of the formula $RCH=RuR'_2(R''_3P)_2$, where R is an alkyl, aryl or vinylic group, R' is a halogen, and R'' is a phenol or cyclohexyl group, and $PhCH=RuCl_2(Cy_3P)_2$, where Ph is a phenyl group and Cy is a cyclohexyl group. The reaction can be carried out with various catalyst amounts, preferably between 0.05 mol % and 1.6 mol %, most preferably, between 0.08 and 0.15 mol %. Biological oil is then added to the catalyst flask. The oil/catalyst mixture is agitated and then added to a reaction vessel containing a volume of biological oil. If the process is a cometathesis process, the other alkene is preferably added during this step. The preferred alkene for cometathesis is norbornadiene at about 20 to 25 wt % of the cometathesis reaction mixture.

The reaction vessel is then subjected to reaction conditions. The metathesis or cometathesis reaction may be carried out at any temperature within the range of about 20 to 250° C., but is preferably carried out within the range of 20 to 100° C. A most preferred range is about 50 to 60° C. The reaction is allowed to proceed for sufficient time to allow the formation of a metathesized product. This time is generally within the range of about 3 to 192 hours, but more preferably is within the range of about 12 to 48 hours.

The natural or modified biological oil in either a separated or unseparated state may also be pre-processed by epoxidization. Any suitable epoxidation process may be used, preferably a low acid process. A suitable process utilizes a methyltrioxorhenium (VII) and pyridine catalytic system as developed by J. Rudolph, K. L. Reddy, J. P. Chiang, and K. B. Sharpless, "Highly Efficient Epoxidation of Olefins Using Aqueous $H_2O_2$ and Catalytic Methyltrioxorhenium/Pyridine: Pyridine-Mediated Ligand Acceleration, "J. Am. Chem. Soc'y 119:6189–90 (1997), which is hereby incorporated herein by reference in its entirety. The preferred epoxidation process is described in copending U.S. patent application Ser. No. 09/075,326.

The modified biological oils may be used directly as the conjugation, metathesis or epoxidation reaction product. Alternatively, any suitable method for removing unreacted substances and by-products to form separated conjugated, metathesized, or expoxidized products from the reaction mixture may be used. A typical method is the addition of a solvent that preferentially dissolves the unreacted substances. The insoluble pure products may then be collected, and evacuated to remove any remaining volatile contaminants. The resulting conjugated, metathesized or expoxidized product is then used as a modified biological oil and subject to the polymerization and copolymerization processes of the invention to make new plastics by the Lewis-acid catalysis method described herein.

The use of chemically modified oils and olefin additives in the Lewis-acid catalyzed thermoset reaction typically gives thermosets which are harder, more stable, and less prone to blooming than natural, unmodified oil. These modified oils include various metathesized oils, cometathesized oils, and conjugated oils from natural biological oils.

We have found that conjugated soybean oil and soybean oil cometathesized with norbornadiene give particularly hard, stable solid materials from the boron trifluoride diethyl etherate copolymerization with divinylbenzene. Natural soybean oil and metathesized soybean oil are, on the other hand, preferably copolymerized with a combination of dicyclopentadiene and divinylbenzene, or norbornadiene and divinylbenzene, to give hard, stable materials.

The Lewis-acid catalyzed copolymerization of fish oil and conjugated fish oil with alkene additives also provides particularly useful thermoset plastics. Copolymers ranging from rubbers to hard plastics may be synthesized by changing the amounts of additives used. Polymers prepared from conjugated fish oil are typically harder and shinier than those prepared from natural fish oil. Differential scanning calorimetric (DSC) analysis of the fish oil thermosets indicates that these are highly crosslinked materials with no apparent thermal phase transitions. The fish oil thermosets are thermally stable up to 250–300° C. and partially soluble in $CH_2Cl_2$, THF, and DMF solvents. The insoluble materials remaining after the extraction of the fish oil thermosets are thermally stable up to 400–450° C.

The glass transition temperatures of the bulk thermosets are typically between 50° C. and 130° C. The modulus at ambient temperature is typically above $10^8$ and can reach as high as $10^9$ Pa, the same magnitude as polyethylene. The decreased presence of un-reacted free oil molecules gives the conjugated fish oil polymers improved mechanical properties and thermal stability.

The thermoset plastics of the invention, i.e., both the bulk reaction product or, if desired for particular applications, the insoluble component, may be used in a wide variety of products including molded articles, such as automotive parts and toys, construction materials, such as composites, laminates, paints, inks, coating materials, adhesives, biocompatible materials for medical uses, food additives, cosmetics, resins, plasticizers, lubricants, corrosion inhibitors, rubbers, oils, and fibers and may be used in compression molding, or transfer or extrusion processes, or any other suitable method known to those skilled in the art of using thermoset plastics to prepare industrial or consumer products.

The thermosetting plastic materials according to the invention may also be combined with one or more additional materials to form a composite, thus taking-advantage of certain desirable properties of each component. The additional component can be organic, inorganic or metallic, and may be present in a variety of forms, such as fibers, rods, particles, plates, foams, etc. The thermoset plastic, typically in the form of a resin, rubber, or adhesive, may be laminated with wood (veneer), paper, fabric and other known materials to make a polymerized biological oil laminate; may be mechanically mixed with fibers, such as glass, carbonaceous types (e.g., pitch), flax, hemp, Irish linen, polymer (e.g., nylon), inorganic types (e.g., boron nitride, silicon carbide and aluminum silicates) and metals (steel, tungsten, etc.) to form a reinforced biological oil plastic; or may be filled with glass flakes or other small particles, such as clay, sand, talc, diatomaceous earth, carbon black, or mica, to form a linoleum or other filled biological oil composite material.

The polymerized biological oil composites according to the invention will typically comprise a polymerized biological oil thermoset and at least one fiber, powder, flake or sheet material which is a solid in the finished state and insoluble with respect to the biological thermoset. The composite may comprise a biological oil thermoset as a continuous matrix phase in which is embedded a three-dimensional distribution of randomly oriented reinforcing elements, e.g., a particulate filled composite; an ordered two-dimensional structure, e.g., an impregnated cloth; or a highly aligned array of parallel fibers, e.g., a filament-wound structure. The composite may also comprise a laminated stacking of sheets of a biological oil thermoset and various other materials in the form of stacked sheets, e.g., plywood, insulation board, laminated paperboard and particle board, wherein the second material is a wood veneer or is a panel of small chips, flakes or particles.

The thermosetting biological oil plastics of the invention are particularly convenient and light weight matrix materials which can embed and grip the second phase fillers, fibers, or other reinforcing materials of the composite. The thermosetting biological oil plastics may be applied in a fluid state, which facilitates penetration and wetting in the unpolymerized state, followed by hardening of the system. The methods used to make the composite material and structure will depend, among other factors, on the type of reinforcement, the required performance level, and the shape of the article. Large diameter, single-filament materials, such as boron, silicon carbide or metal wires, may be fed in precisely controlled, parallel arrays to form tapes of sheet materials. In the case of finer filaments, such as fiberglass, carbon fiber, or boron nitride fiber, bundles of thousands of loosely aggregated fibers may be handled as an entity. When these fibers are to be incorporated into a polymer matrix composite, it is typically most convenient to form a semiprocessed, shapable, intermediate ribbon or sheet prepeg in which the fibers will then be infiltrated by the incompletely cured biological thermosetting material. Another approach is to form dry structures first, such as wire armatures, which are then impregnated with the biological oil matrix material.

The biological oil thermoset composites of the invention may be molded or machined, i.e., sawed, drilled, ground, sanded, milled or turned, to make, for example, plastics for aircraft and marine applications, health related applications such as prosthesis equipment, sporting goods equipment, automobile parts, and various engineering plastics. They are also useful for construction applications (e.g., corrugated sheets, space dividers, flooring, showers/tubs, light-control panels) and for the electrical and chemical industries (e.g., insulation panels, printed circuits, pipes, ducts, and tanks).

It is to be understood that the application of the teachings of the present invention to a specific problem or environment will be within the capabilities of one having ordinary skill in the art in light of the teachings contained herein. Examples of the products and processes of the present invention appear in the following examples.

EXAMPLE 1

Preparation of Soybean Oil Plastics By Polymerization of Soy Oil and Modified Soy Oil Materials. The soybean oil used in the following experiments was a commercial, food-grade quality and was used without further purification. Conjugated soybean oil was prepared by the rhodium-catalyzed isomerization of soy oil, as disclosed in U.S. Provisional Patent Application Ser. No. 60/080,068, filed Mar. 31, 1998, which is hereby expressly incorporated by reference herein in its entirety. Metathesized soybean oil and soybean oil cometathesized with norbornadiene were prepared according to the method disclosed in U.S. Patent Application Ser. No. 09/075,326, filed May 11, 1998, which is hereby expressly incorporated by reference herein in its entirety. All other reagents were supplied by Aldrich Chemical Co. and were used without further purification unless otherwise stated. In the tabulated data, the following abbreviations have been used: comet. soy= soybean oil-olefin cometathesis product as synthesised with the stated amount by weight of norbornadiene; con. soy= conjugated soybean oil; met. soy=olefin metathesized soybean oil; comet. not sep.=crude product from olefin cometathesis of soybean oil and norbornadiene; met. not sep.= crude product from the olefin metathesis of soybean oil; comet. sep.=soybean oil and norbornadiene cometathesis product purified with an ethanol wash; met. sep.=soybean oil metathesis product purified by an ethanol wash.

Representative Procedure A: Polymerization of soybean oil using boron trifluoride diethyl etherate complex. Soybean oil (4.810 g), cyclopentadiene dimer (1.400 g), and divinylbenzene (0.968 g) were mixed in an oven-dried vial (6 dram) using a wooden stick. Boron trifluoride diethyl etherate complex (0.28 g) was added by disposable syringe. The components were thoroughly mixed using a wooden stick. The vial was purged with argon and capped. The vial was placed in an oil bath or an oven (110° C.) for 48 h. The reaction mixture set in 1 h (did not flow). At 48 h, the vial was broken and a brown, hard solid was obtained in quantitative yield.

Representative Procedure B: Polymerization of a modified soybean oil using boron trifluoride diethyl etherate complex. An oven-dried vial (2 dram) was charged with prepolymer (olefin metathesis product of soybean oil and 25% by weight of norbornadiene) and diallyl terephthalate (0.1950 g). The components were mixed using a wooden stick. Boron trifluoride diethyl etherate complex (0.088 g) was added by disposable syringe. The components were mixed using a wooden stick. The mixture immediately became a black color. The vial was capped, and placed in an oil bath or an oven (40° C.) for 48 h. The mixture was set (unable to flow) in 1 h. At 48 h, the vial was broken, and a shiny, black, semi-hard, pliable material (1.60 g) was obtained.

A) Thermosets of soybean oil

The heating of soybean oil in the presence of boron trifluoride diethyl etherate complex (4–7% by weight) caused the oil to set to a solid that resembled natural rubber. This chemical process occurred efficiently at 110° C. The samples obtained were of a brown color, and had rubbery physical characteristics.

Soybean oil that had been chemically modified by olefin cometathesis with norbornadiene (20% by weight) was polymerized with varying amounts of the boron catalyst (Table 1, entries 9–13). A hard, glossy, black solid was obtained with as little as 2% boron trifluoride diethyl etherate (entry 11) and the catalyst at the 1% level (entry 12) still gave a firm, black solid. Blooming was decreased using a modified soybean oil. To obtain a thermoset with long-term stability to moisture, at least 4% catalyst was required.

B) Thermosets of soybean oil with two olefin additives

The reaction of soybean oil, divinylbenzene, and dicyclopentadiene for 48 h at 110° C. produced materials that were brown in color. The physical nature of the thermosets varied with the formulation of the reaction mixture. When 30% by weight of the product thermoset was composed of divinylbenzene and dicyclopentadiene, a hard, brown solid was produced.

The reactions of norbornadiene and divinylbenzene with soybean oil using the boron catalyst proved similar to the reactions of dicyclopentadiene. A temperature of 70° C. for 24 h was held so the reaction mixture could gel without boiling off the norbornadiene. The temperature was then increased to 110° C. for 48 h to set the polymer. The compositions which had 10% or a greater amount of both divinylbenzene and norbornadiene gave a suitable product. With the addition of norbornadiene as an additive only 1% of the boron catalyst was required to achieve a thermoset which was hard and stable to moisture.

C) Thermosets of soybean oil/norbornadiene cometathesized copolymer with one additive The reactivity of the modified oil was much faster than that of the natural soy oil to boron trifluoride diethyl etherate catalysis. A number of olefins were evaluated as potential additives in the thermoset reaction of soybean oil cometathesized with 25% by weight of norbornadiene. The temperature at which these materials reacted was much lower (40° C.) than that of soybean oil itself.

The cometathesized oil by itself gave a glossy, black solid, but the material was very crumbly. However, the use of divinylbenzene, styrene, and α-methylstyrene as additives gave curable materials.

The tables below tabulate the effect of changing the norbornadiene content in the modified oil, the ratio of boron catalyst, and the ratio of olefin additive. The objective was to discover the lowest ratio of norbornadiene content in the modified oil, as well as the lowest ratios of olefin additive and catalyst needed to obtain a stable, hard thermoset material.

In Table 2, the best materials obtained with the modified oil containing 20% norbornadiene are listed in entries 1–5. The copolymer used was not purified before use and was, in fact, crude reaction material from the olefin metathesis reaction. The boron catalyst is preferably present in at least 5% by weight when using divinylbenzene as an additive, since the thermosets were fragile when lower amounts of catalyst were used. The materials were hard, black, stable solids without much dependence upon the level of divinylbenzene.

The purified cometathesized soy oils with 20 weight % norbornadiene were studied using the same additives and the results were listed in Tables 3–5. The results are comparable to those of the unpurified cometathesized oil. The best materials were obtained from the purified, cometathesized soybean oils with a level of at least 11 or 20% norbornadiene and a catalyst load of 5% boron trifluoride diethyl etherate plus divinylbenzene (Table 6).

D) Thermosets of conjugated soybean oil

Conjugated soybean oil is more reactive in these thermoset reactions than natural soybean oil. The use of a two additive system with conjugated soybean oil in the thermoset reaction was very successful.

Norbornadiene and divinylbenzene were thermoset in the presence of conjugated soybean oil to give glossy, rubbery, brown solids (Table 7). These thermosets had excellent properties, i.e., no oily phases in the thermoset, little blooming of oils, and no significant decomposition over time in air when the boron catalyst ratio was at least 2% by weight. The higher the ratio of divinylbenzene, the harder the thermoset was (Table 7, entry 5). The lower concentrations of divinylbenzene gave a more rubbery material (entry 3). These thermosets have a tendency to continue the curing process at room temperature over time. Most samples studied with higher concentrations of divinylbenzene became more rigid over a period of months. The use of 1% boron trifluoride catalyst still gave materials with very desirable properties. Conjugated soybean oil with 1% catalyst and 10% each of norbornadiene and divinylbenzene by weight gave a solid that was brown in color, glossy, and slightly rubbery in nature (entry 16). The thermosets with divinylbenzene used alone (Table 8) gave hard, glossy, brown solids when the divinylbenzene content was 15% or higher (entries 3–6).

The divinylbenzene-dicyclopentadiene-conjugated soybean oil thermoset system achieved very tough materials (Table 9). This could be accomplished with as little as 1% catalyst (entries 13–18). Again the higher the level of divinylbenzene, the tougher the material. The bottom of the thermoset plugs were usually harder than the top. This is due to increased heating on the bottom of the samples during the curing process from the radiant heat coming from the heating elements on the bottom of the oven.

E) Thermosets of metathesized soybean oil

The modified soybean oil resulting from the olefin metathesis of soybean oil readily formed solids in the boron trifluoride-catalyzed thermoset reaction. These oils are more reactive than unmodified soybean oil, but are less reactive than cometathesized or conjugated soybean oil.

The modified oils were used as the crude reaction mixture from the olefin metathesis or the modified oils were purified by washing with ethanol. The ethanol wash aided in removing the unreacted soybean oil giving higher molecular weight oligomers. These modified oils were reacted with divinylbenzene, divinylbenzene and dicyclopentadiene, or divinylbenzene and norbornadiene.

The purified, metathesized soybean oils (Tables 10–12) gave thermosets which were less tacky, oily, and rubbery than the unseparated, metathesized oils. The reaction of separated, metathesized soybean oil with divinylbenzene using boron trifluoride diethyl etherate gave glossy, firm to hard, brown solids after curing at 110° C. for 72 h. The amount of boron catalyst did not greatly effect the nature of the thermoset (Table 10). The greatest impact that was noted for the properties of the thermosets was that the greater the amount of divinylbenzene, the harder the thermoset materials. With 30% divinylbenzene (entry 6), a hard, glossy, dark-brown solid was obtained. The thermoset formed from 5% by weight divinylbenzene was glossy, but rubbery. Over a period of weeks to months, all of the samples in Table 10 became somewhat more rigid as they sat at room temperature.

Table 11 lists the materials obtained from the reaction of the two additives, dicyclopentadiene and divinylbenzene, with separated, metathesized soybean oil. These materials were more rubbery than those that were thermoset with just divinylbenzene. However, when the amounts of dicyclopentadiene were 10% and above, the thermoset materials were hard and glossy. The amounts of boron catalyst in this two additive system did affect the physical properties of the thermosets. When 2 to 6% boron catalyst was used, the thermosets were firm to hard, but with the catalyst load at 1%, the materials were rubbery.

Table 12 shows the thermosets of purified, metathesized soybean oil, divinylbenzene, and norbornadiene. The amount of catalyst did not affect the physical nature of the thermosets. The ratio of norbornadiene did greatly influence the hardness of the thermosets. When 10% or greater by weight of the thermoset formulation was norbornadiene, the product materials were hard, glossy, dark-brown solids. The yields are nearly quantitative.

TABLE 1

Polymerization of Soy Oil and Divinylbenzene or Soy Oil,
Divinylbenzene, and Dicyclopentadiene Using Varying
Amounts of Boron Trifluoride Diethyl Etherate at 110° C. for 48 h

| entry | soy oil (weight %) | $BF_3 \cdot OEt_2$ (weight %) | divinylbenzene (weight %) | dicyclopentadiene (weight %) | appearance of product material |
|---|---|---|---|---|---|
| 1 | 69 | 3 | 14 | 14 | glossy, hard, brown solid, harder on bottom |
| 2 | 70 | 2 | 14 | 14 | sticky, fragile, brown solid |
| 3 | 71 | 1 | 14 | 14 | sponge-like, brown solid |
| 4 | 71.5 | 0.5 | 14 | 14 | brown liquid |
| 5 | 69 | distilled 3 | 14 | 14 | hard, brown solid |
| 6 | 70 | distilled 2 | 14 | 14 | hard, brown solid |
| 7 | 71 | distilled 1 | 14 | 14 | soft, gummy, fragile, solid |
| 8 | 71.5 | distilled 0.5 | 14 | 14 | brown liquid |
| 9 | comet. soy (20) 60 | 27 | 13 | — | oily, brittle, black solid |
| 10 | 80 | 4 | 16 | — | hard, glossy, black solid |
| 11 | 81 | 2 | 17 | — | hard, glossy, black solid |
| 12 | 82 | 1 | 17 | — | slightly glossy and firm, black solid |
| 13 | 82 | 0.6 | 17 | — | soft, black solid |

TABLE 2

Polymerization of Cometathesized (20% Norbornadiene, Not Separated)
Soy Oil and Divinylbenzene Using Catalytic Boron Trifluoride
Diethyl Etherate at 110° C. for 48 h

| entry | comet. soy (weight %) | $BF_3 \cdot OEt_2$ (weight %) | additive (weight %) | appearance of product material | % yield |
|---|---|---|---|---|---|
| 1 | 90 | 5 | 5 | black, hard solid | 96 |
| 2 | 85 | 5 | 10 | black, hard solid | 96 |
| 3 | 80 | 5 | 15 | black, hard solid | 96 |
| 4 | 75 | 5 | 20 | black, hard solid | 91 |
| 5 | 70 | 5 | 25 | black, hard solid | 91 |
| 6 | 65 | 5 | 30 | black, hard solid with white inclusions | 93 |
| 7 | 93 | 2 | 5 | fragile, soft, slight gloss, black solid | 88 |
| 8 | 88 | 2 | 10 | fragile, soft, slight gloss, black solid | 83 |
| 9 | 83 | 2 | 15 | fragile, black solid | 92 |
| 10 | 78 | 2 | 20 | fragile, black solid | 92 |
| 11 | 73 | 2 | 25 | fragile, black solid | 95 |
| 12 | 68 | 2 | 30 | fragile, hard, black solid | 93 |
| 13 | 94 | 1 | 5 | fragile, soft, black solid | 93 |
| 14 | 89 | 1 | 10 | fragile, soft, black solid | 93 |
| 15 | 84 | 1 | 15 | fragile, firm, black solid | 94 |
| 16 | 79 | 1 | 20 | fragile, firm, black solid | 92 |
| 17 | 74 | 1 | 25 | fragile, firm, black solid | 89 |
| 18 | 69 | 1 | 30 | hard, brown-black solid | 89 |

TABLE 3

Polymerization of Cometathesized (20% Norbornadiene, Separated) Soy Oil and Divinylbenzene Using Catalytic Boron Trifluoride Diethyl Etherate at 110° C. for 48 h

| entry | comet. soy (weight %) | BF$_3$.OEt$_2$ (weight %) | divinylbenzene (weight %) | appearance of product material | % yield |
|---|---|---|---|---|---|
| 1 | 90 | 5 | 5 | smooth, hard, black solid | 93 |
| 2 | 85 | 5 | 10 | glossy, smooth, hard, black solid | 94 |
| 3 | 80 | 5 | 15 | glossy, smooth, hard, black solid | 93 |
| 4 | 75 | 5 | 20 | glossy, hard, black solid | 93 |
| 5 | 70 | 5 | 25 | glossy, hard, black solid | 94 |
| 6 | 65 | 5 | 30 | glossy, smooth, hard, black solid | 87 |
| 7 | 93 | 2 | 5 | slightly wet, soft, black solid | 95 |
| 8 | 88 | 2 | 10 | slightly wet, slightly soft, brown-black solid | 86 |
| 9 | 83 | 2 | 15 | smooth, hard, black solid | 90 |
| 10 | 78 | 2 | 20 | hard, black solid | 88 |
| 11 | 73 | 2 | 25 | glossy, hard, black solid | 90 |
| 12 | 68 | 2 | 30 | glossy, hard, black solid | 95 |
| 13 | 94 | 1 | 5 | dull, soft, black solid | 87 |
| 14 | 89 | 1 | 10 | soft, black solid | 89 |
| 15 | 84 | 1 | 15 | very soft, brown-black solid | 85 |
| 16 | 79 | 1 | 20 | soft, brown-black solid | 83 |
| 17 | 74 | 1 | 25 | wet, brown solid | 80 |
| 18 | 69 | 1 | 30 | dull, brown-black solid | 80 |

TABLE 4

Polymerization of Cometathesized (20% Norbornadiene, Separated) Soy Oil and Styrene Using Catalytic Boron Trifluoride Diethyl Etherate at 110° C. for 48 h

| entry | comet. soy (weight %) | BF$_3$.OEt$_2$ (weight %) | styrene (weight %) | appearance of product material | % yield |
|---|---|---|---|---|---|
| 1 | 90 | 5 | 5 | fragile, hard, black solid | 89 |
| 2 | 85 | 5 | 10 | glossy, hard, black solid | 93 |
| 3 | 80 | 5 | 15 | oily, slightly soft, black solid | 94 |
| 4 | 75 | 5 | 20 | oily, slightly soft, black solid | 95 |
| 5 | 70 | 5 | 25 | slightly soft, brown-black solid | 96 |
| 6 | 65 | 5 | 30 | slightly wet, dull, soft, black solid | 92 |
| 7 | 93 | 2 | 5 | slightly wet, glossy, hard, black solid | 96 |
| 8 | 88 | 2 | 10 | glossy, hard, black solid | 88 |
| 9 | 83 | 2 | 15 | slightly soft, black solid | 87 |
| 10 | 78 | 2 | 20 | soft, black-brown solid | 84 |
| 11 | 73 | 2 | 25 | soft, black solid | 95 |
| 12 | 68 | 2 | 30 | soft, black solid | 86 |
| 13 | 94 | 1 | 5 | fragile, soft, black solid | 94 |
| 14 | 89 | 1 | 10 | fragile, soft, black solid | 89 |
| 15 | 84 | 1 | 15 | fragile, soft, black solid | 84 |
| 16 | 79 | 1 | 20 | soft, black solid with liquid phase | 79 |
| 17 | 74 | 1 | 25 | soft, black solid with liquid phase | 74 |
| 18 | 69 | 1 | 30 | rubbery, soft, black solid | 69 |

TABLE 5

Polymerization of Cometathesized
(20% Norbornadiene, Separated) Soy Oil and α-Methylstyrene Using
Catalytic Boron Trifluoride Diethyl Etherate at 110° C. for 48 h

| entry | comet. soy (weight %) | $BF_3 \cdot OEt_2$ (weight %) | α-methylstyrene (weight %) | appearance of product material | % yield |
|---|---|---|---|---|---|
| 1 | 90 | 5 | 5 | slightly soft, black solid | 92 |
| 2 | 85 | 5 | 10 | wet, slightly soft, black solid | 86 |
| 3 | 80 | 5 | 15 | wet, slightly soft, black solid | 98 |
| 4 | 75 | 5 | 20 | glossy, wet, slightly soft, black solid | 94 |
| 5 | 70 | 5 | 25 | glossy, wet, slightly soft, black solid | 97 |
| 6 | 65 | 5 | 30 | wet, slightly soft, black solid | 95 |
| 7 | 93 | 2 | 5 | glossy, firm, black solid with soft top | 83 |
| 8 | 88 | 2 | 10 | firm, black solid with soft top | 80 |
| 9 | 83 | 2 | 15 | very fragile, very soft, black solid | 64 |
| 10 | 78 | 2 | 20 | very fragile, very soft, black solid | 75 |
| 11 | 73 | 2 | 25 | gooey, black solid | 64 |
| 12 | 68 | 2 | 30 | soft, rubbery, black solid | 82 |
| 13 | 94 | 1 | 5 | soft, gooey, black solid | 69 |
| 14 | 89 | 1 | 10 | soft, gooey, black solid | 60 |
| 15 | 84 | 1 | 15 | dark liquid | — |
| 16 | 79 | 1 | 20 | dark liquid | — |
| 17 | 74 | 1 | 25 | dark liquid | — |
| 18 | 69 | 1 | 30 | dark liquid | — |

TABLE 6

Polymerization of Cometathesized (11% Norbornadiene, Separated)
Soy Oil and α-Methylstyrene, Styrene, or Divinylbenzene Using
Catalytic Boron Trifluoride Diethyl Etherate at 110° C. for 48 h

| entry | comet. soy (weight %) | $BF_3 \cdot OEt_2$ (weight %) | additive (weight %) | appearance of product material | % yield |
|---|---|---|---|---|---|
| 1 | 90 | 5 | divinylbenzene 5 | glossy, firm but pliable, black solid | 96 |
| 2 | 85 | 5 | 10 | glossy, firm but pliable, black solid | 97 |
| 3 | 80 | 5 | 15 | glossy, hard, black solid | 96 |
| 4 | 75 | 5 | 20 | very hard, glossy, black solid | 89 |
| 5 | 70 | 5 | 25 | pliable, black solid with bubbled bottom | 95 |
| 6 | 65 | 5 | 30 | glossy, hard, dark-brown solid | 97 |
| 7 | 90 | 5 | styrene 5 | pliable, black solid with bubbled bottom | 95 |
| 8 | 85 | 5 | 10 | soft, black solid with bubbled bottom | 94 |
| 9 | 80 | 5 | 15 | glossy, slightly pliable, black solid | 97 |
| 10 | 75 | 5 | 20 | pliable, black solid | 98 |
| 11 | 70 | 5 | 25 | sticky, soft, black solid | 96 |
| 12 | 65 | 5 | 30 | tacky, soft, black solid with bubbled bottom | 91 |
| 13 | 90 | 5 | α-methylstyrene 5 | bubbled, soft, sticky, black solid | 84 |
| 14 | 85 | 5 | 10 | soft, bouncy, black solid with bubbled bottom | 95 |
| 15 | 80 | 5 | 15 | soft, black solid with liquid phase | 68 |
| 16 | 75 | 5 | 20 | soft, black solid with liquid phase | 86 |

TABLE 7

Polymerization of Conjugated Soy Oil, Divinylbenzene, and Norbornadiene Using Catalytic Boron Trifluoride Diethyl Etherate at 60° C. for 24 h then 110° C. for 48 h

| entry | con. soy (weight %) | BF$_3$ · OEt$_2$ (weight %) | norbornadiene (weight %) | divinylbenzene (weight %) | appearance of product material | % yield |
|---|---|---|---|---|---|---|
| 1 | 84 | 5 | 5 | 5 | rubbery, glossy, dark-brown solid | 97 |
| 2 | 80 | 5 | 5 | 10 | glossy, rubbery, dark-brown solid but firm on bottom | 97 |
| 3 | 79 | 5 | 10 | 5 | glossy, rubbery, dark-brown solid but firm on bottom | 97 |
| 4 | 75 | 5 | 10 | 10 | glossy, firm, dark-brown solid, hard on bottom | 97 |
| 5 | 65 | 5 | 10 | 20 | glossy, firm, dark-brown solid, very hard on bottom | 96 |
| 6 | 65 | 5 | 20 | 10 | very glossy, very hard, dark-brown solid | 97 |
| 7 | 87 | 2 | 5 | 5 | glossy, slightly rubbery, slightly brittle, dark-brown solid | 97 |
| 8 | 83 | 2 | 5 | 10 | glossy, firm, dark-brown solid, more firm on bottom | 97 |
| 9 | 83 | 2 | 10 | 5 | glossy, slightly rubbery, dark-brown solid | 98 |
| 10 | 78 | 2 | 10 | 10 | glossy, firm, dark-brown solid, hard on bottom | 97 |
| 11 | 68 | 2 | 10 | 20 | glossy, firm, dark-brown solid, very hard on bottom | 98 |
| 12 | 71 | 2 | 21 | 6 | glossy, firm, dark-brown solid, more firm on bottom | 97 |
| 13 | 88 | 1 | 5 | 5 | glossy, rubbery, dark-brown solid | 97 |
| 14 | 84 | 1 | 5 | 10 | glossy, rubbery, dark-brown solid, firm on bottom | 97 |
| 15 | 83 | 1 | 10 | 5 | slightly brittle, glossy, rubbery, dark-brown solid | 97 |
| 16 | 79 | 1 | 10 | 10 | glossy, slightly rubbery, dark-brown solid, hard on bottom | 98 |
| 17 | 69 | 1 | 10 | 20 | very hard, glossy, dark-brown solid | 97 |
| 18 | 72 | 1 | 21 | 6 | glossy, firm on top, dark-brown solid | 97 |
| 19 | 68 | 2 | 20 | 10 | very hard, glossy, dark-brown solid | 98 |
| 20 | 69 | 1 | 20 | 10 | slightly brittle, glossy, hard, dark-brown solid | 94 |

TABLE 8

Polymerization of Conjugated Soy Oil and Divinylbenzene Using Catalytic Boron Trifluoride Diethyl Etherate at 110° C. for 72 h

| entry | con. soy (weight %) | BF$_3$ · OEt$_2$ (weight %) | divinylbenzene (weight %) | appearance of product material | % yield |
|---|---|---|---|---|---|
| 1 | 90 | 5 | 5 | glossy, firm, dark-brown solid | 97 |
| 2 | 85 | 5 | 10 | glossy, firm, dark-brown solid with yellow particulates on bottom | 95 |
| 3 | 80 | 5 | 15 | hard, glossy, dark-brown solid, harder on bottom, yellow particulates on bottom | 93 |
| 4 | 75 | 5 | 20 | hard, glossy, dark-brown solid, harder on bottom, yellow particulates on bottom | 93 |
| 5 | 70 | 5 | 25 | glossy, very hard, dark-brown solid with yellow particulates on bottom | 96 |

TABLE 8-continued

Polymerization of Conjugated Soy Oil and Divinylbenzene Using Catalytic Boron Trifluoride Diethyl Etherate at 110° C. for 72 h

| entry | con. soy (weight %) | BF$_3$ · OEt$_2$ (weight %) | divinylbenzene (weight %) | appearance of product material | % yield |
|---|---|---|---|---|---|
| 6 | 65 | 5 | 30 | glossy, very hard, dark-brown solid with yellow particulates on bottom | 97 |
| 7 | 92 | 2 | 6 | slightly rubbery, glossy, dark-brown solid | 96 |
| 8 | 88 | 2 | 10 | very slightly rubbery, glossy, dark-brown solid, hard crust with yellow particulates | 96 |
| 9 | 83 | 2 | 15 | glossy, firm, dark-brown solid with yellow particulates on bottom | 97 |
| 10 | 78 | 2 | 20 | glossy, hard, dark-brown solid, harder on bottom, yellow particulates on bottom | 97 |
| 11 | 73 | 2 | 25 | glossy, very hard, dark-brown solid, yellow particulates on bottom | 96 |
| 12 | 68 | 2 | 30 | glossy, rubbery, dark-brown solid, bottom firm with yellow particulates | 97 |
| 13 | 94 | 1 | 5 | glossy, rubbery, brittle, dark-brown solid, darker brown on top | 95 |
| 14 | 88 | 1 | 11 | glossy, rubbery, dark-brown solid, bottom firm with yellow particulates | 96 |
| 15 | 84 | 1 | 15 | rubbery, clear-amber solid on top; hard, brown solid bottom with yellow particulates | 94 |
| 16 | 79 | 1 | 20 | rubbery, clear-amber solid on top; hard, brown solid bottom with yellow particulates | 94 |
| 17 | 74 | 1 | 25 | rubbery, clear-amber solid on top; hard, brown solid bottom with yellow particulates | 95 |
| 18 | 69 | 1 | 30 | rubbery, clear-amber solid on top; hard, brown solid bottom with yellow particulates | 97 |

TABLE 9

Polymerization of Conjugated Soy Oil, Divinylbenzene, and Dicyclopentadiene Using Catalytic Boron Trifluoride Diethyl Etherate at 110° C. for 72 h

| entry | con. soy (weight %) | BF$_3$ · OEt$_2$ (weight %) | dicyclopentadiene (weight %) | divinylbenzene (weight %) | appearance of product material | % yield |
|---|---|---|---|---|---|---|
| 1 | 85 | 5 | 5 | 5 | rubbery, glossy, dark-brown solid | 96 |
| 2 | 80 | 5 | 5 | 10 | glossy, firm, dark-brown solid but harder on bottom | 97 |
| 3 | 80 | 5 | 10 | 5 | glossy, firm, dark-brown solid | 97 |
| 4 | 74 | 6 | 10 | 10 | glossy, firm on top, hard on bottom, dark-brown solid | 97 |
| 5 | 64 | 5 | 10 | 20 | glossy, hard, dark-brown solid | 97 |
| 6 | 65 | 5 | 20 | 10 | very glossy, very hard, dark black-brown solid | 97 |
| 7 | 88 | 2 | 5 | 5 | glossy, rubbery, brown solid | 96 |
| 8 | 83 | 2 | 5 | 10 | glossy, hard, brown solid, harder on the bottom | 96 |

TABLE 9-continued

Polymerization of Conjugated Soy Oil, Divinylbenzene, and Dicyclopentadiene Using Catalytic Boron Trifluoride Diethyl Etherate at 110° C. for 72 h

| entry | con. soy (weight %) | BF$_3$·OEt$_2$ (weight %) | dicyclopentadiene (weight %) | divinylbenzene (weight %) | appearance of product material | % yield |
|---|---|---|---|---|---|---|
| 9 | 83 | 2 | 10 | 5 | glossy, rubbery, dark-brown solid, harder crust on bottom | 97 |
| 10 | 78 | 2 | 10 | 10 | glossy, rubbery, dark-brown solid, hard on bottom | 96 |
| 11 | 68 | 2 | 10 | 20 | very glossy, hard, dark-brown solid, harder on bottom, yellow particulates on bottom | 94 |
| 12 | 68 | 2 | 20 | 10 | very glossy, firm, dark-brown solid | 97 |
| 13 | 89 | 1 | 5 | 5 | glossy, rubbery, brittle, dark-brown solid | 98 |
| 14 | 84 | 1 | 5 | 10 | glossy, rubbery, brittle, dark-brown solid, more rubbery on top | 96 |
| 15 | 84 | 1 | 10 | 5 | glossy, rubbery, very slightly brittle, dark-brown solid | 97 |
| 16 | 79 | 1 | 10 | 10 | somewhat rubbery, glossy, dark-brown solid | 97 |
| 17 | 69 | 1 | 10 | 20 | glossy, firm, dark-brown solid, hard on bottom, yellow particulates on bottom | 97 |
| 18 | 69 | 1 | 20 | 10 | extremely rubbery, glossy, dark-brown solid | 97 |

TABLE 10

Polymerization of Metathesized (Separated) Soy Oil and Divinylbenzene Using Catalytic Boron Trifluoride Diethyl Etherate at 110° C. for 72 h

| entry | met. soy (weight %) | BF$_3$·OEt$_2$ (weight %) | divinylbenzene (weight %) | appearance of product material | % yield |
|---|---|---|---|---|---|
| 1 | 90 | 5 | 5 | glossy, rubbery, dark-brown solid | 96 |
| 2 | 84 | 6 | 10 | slightly rubbery, glossy, dark-brown solid | 97 |
| 3 | 80 | 5 | 15 | glossy, resistant to pressure, dark-brown solid | 96 |
| 4 | 74 | 6 | 20 | glossy, firm, dark-brown solid, harder on bottom | 96 |
| 5 | 70 | 6 | 24 | glossy, hard, dark-brown solid, rubbery at the top | 97 |
| 6 | 64 | 6 | 30 | hard, glossy, dark-brown solid | 95 |
| 7 | 93 | 2 | 5 | glossy, rubbery, somewhat brittle, dark-brown solid | 96 |
| 8 | 88 | 2 | 10 | slightly rubbery, glossy, dark-brown solid | 93 |
| 9 | 83 | 2 | 15 | glossy, firm, brown solid | 94 |
| 10 | 75 | 2 | 23 | glossy, dark-brown solid, firm on top, hard on bottom | 96 |
| 11 | 72 | 2 | 26 | glossy, hard, dark-brown solid, harder on bottom | 96 |
| 12 | 68 | 2 | 30 | glossy, hard, dark-brown solid | 95 |
| 13 | 94 | 1 | 5 | rubbery, brittle, glossy, dark-brown solid | 88 |
| 14 | 89 | 1 | 10 | rubbery, brown solid, top is softer | 95 |
| 15 | 84 | 1 | 15 | glossy, firm, brittle, brown solid | 92 |
| 16 | 79 | 1 | 20 | hard, glossy, brown solid, top is softer | 90 |

TABLE 10-continued

Polymerization of Metathesized (Separated) Soy Oil and Divinylbenzene Using Catalytic Boron Trifluoride Diethyl Etherate at 110° C. for 72 h

| entry | met. soy (weight %) | BF$_3$ · OEt$_2$ (weight %) | divinylbenzene (weight %) | appearance of product material | % yield |
|---|---|---|---|---|---|
| 17 | 78 | 1 | 21 | hard, glossy, brown solid, top is softer | 94 |
| 18 | 69 | 1 | 30 | glossy, hard, dark-brown solid | 95 |
| 19 | 74 | 1 | 25 | glossy, hard, dark-brown solid | 97 |

TABLE 11

Polymerization of Metathesized Soy Oil (Separated), Divinylbenzene, and Dicyclopentadiene Using Catalytic Boron Trifluoride Diethyl Etherate at 110° C. for 72 h

| entry | met. soy oil (weight %) | BF$_3$ · OEt$_2$ (weight %) | dicyclopentadiene (weight %) | divinylbenzene (weight %) | appearance of product material | % yield |
|---|---|---|---|---|---|---|
| 1 | 85 | 6 | 5 | 5 | glossy, somewhat rubbery, very slightly brittle, dark-brown solid | 97 |
| 2 | 79 | 6 | 5 | 10 | glossy, firm, dark-brown solid, firmer on bottom | 97 |
| 3 | 79 | 6 | 10 | 5 | glossy, slightly rubbery, dark-brown solid, firmer on bottom | 97 |
| 4 | 74 | 6 | 10 | 10 | glossy, firm, dark-brown solid, firmer on bottom | 97 |
| 5 | 65 | 6 | 10 | 20 | hard, glossy, dark-brown solid, harder on bottom | 96 |
| 6 | 65 | 6 | 20 | 10 | hard, glossy, dark-brown solid, harder on bottom | 96 |
| 7 | 87 | 2 | 5 | 5 | glossy, slightly rubbery, dark-brown solid | 97 |
| 8 | 83 | 2 | 5 | 10 | glossy, firm, dark-brown solid, firmer on bottom | 97 |
| 9 | 83 | 2 | 10 | 5 | slightly rubbery, glossy, dark-brown solid | 97 |
| 10 | 77 | 2 | 10 | 11 | glossy, slightly rubbery, dark-brown solid, hard on bottom | 96 |
| 11 | 68 | 2 | 10 | 20 | glossy, hard, dark-brown solid, harder on bottom | 97 |
| 12 | 67 | 2 | 21 | 10 | glossy, hard, dark-brown solid, harder on bottom | 97 |
| 13 | 89 | 1 | 5 | 5 | very rubbery and crumbly, dark-brown solid | 95 |
| 14 | 83 | 1 | 5 | 10 | glossy, rubbery, dark-brown solid | 94 |
| 15 | 82 | 1 | 10 | 7 | glossy, very rubbery, slightly brittle, dark-brown solid | 96 |
| 16 | 79 | 1 | 10 | 10 | very rubbery, brittle, crumbly, dark-brown solid | 93 |
| 17 | 69 | 1 | 10 | 20 | glossy, hard, dark-brown solid, very hard bottom | 96 |

TABLE 11-continued

Polymerization of Metathesized Soy Oil (Separated), Divinylbenzene, and Dicyclopentadiene Using Catalytic Boron Trifluoride Diethyl Etherate at 110° C. for 72 h

| entry | met. soy oil (weight %) | $BF_3 \cdot OEt_2$ (weight %) | dicyclopentadiene (weight %) | divinylbenzene (weight %) | appearance of product material | % yield |
|---|---|---|---|---|---|---|
| 18 | 69 | 1 | 20 | 10 | dark-brown solid, very soft and tacky bottom, top is rubbery | 88 |

TABLE 12

Polymerization of Metathesized Soy Oil (Separated), Divinylbenzene, and Norbornadiene Using Catalytic Boron Trifluoride Diethyl Etherate at 60° C. for 24 h then 110° C. for 24 h

| entry | met. soy oil (weight %) | $BF_3 \cdot OEt_2$ (weight %) | norbornadiene (weight %) | divinylbenzene (weight %) | appearance of product material | % yield |
|---|---|---|---|---|---|---|
| 1 | 85 | 5 | 5 | 5 | glossy, slightly rubbery, dark-brown solid | 96 |
| 2 | 79 | 5 | 6 | 10 | glossy, dark-brown solid, slightly rubbery on top, hard on bottom | 98 |
| 3 | 79 | 6 | 10 | 5 | glossy, dark-brown solid, slightly rubbery on top, more firm on bottom | 97 |
| 4 | 75 | 5 | 10 | 10 | glossy, dark-brown solid, slightly rubbery on top, hard on bottom | 97 |
| 5 | 64 | 5 | 10 | 20 | glossy, hard, dark-brown solid, very hard on bottom | 98 |
| 6 | 64 | 5 | 20 | 10 | glossy, very hard, dark-brown solid | 97 |
| 7 | 87 | 2 | 5 | 5 | slightly rubbery, glossy, dark-brown solid | 98 |
| 8 | 82 | 2 | 5 | 10 | glossy, dark-brown solid, slightly rubbery on top, hard on bottom | 97 |
| 9 | 83 | 2 | 10 | 5 | glossy, firm, dark-brown solid | 98 |
| 10 | 78 | 2 | 10 | 11 | glossy, dark-brown solid, firm on top, hard on bottom | 98 |
| 11 | 68 | 2 | 10 | 20 | very hard, glossy, dark-brown solid | 98 |
| 12 | 71 | 2 | 21 | 10 | very glossy, very hard, dark-brown solid | 99 |
| 13 | 88 | 1 | 5 | 5 | glossy, dark-brown solid, rubbery but firm on the bottom, slightly brittle | 96 |
| 14 | 83 | 1 | 5 | 10 | glossy, firm, dark-brown solid, top is sticky | 96 |
| 15 | 83 | 1 | 10 | 7 | glossy, firm, dark-brown solid, top is sticky and barely solid | 96 |
| 16 | 79 | 1 | 10 | 10 | glossy, firm, dark-brown solid, hard on bottom | 96 |

TABLE 12-continued

Polymerization of Metathesized Soy Oil (Separated), Divinylbenzene, and Norbornadiene
Using Catalytic Boron Trifluoride Diethyl Etherate at 60° C. for 24 h then 110° C. for 24 h

| entry | met. soy oil (weight %) | $BF_3 \cdot OEt_2$ (weight %) | norbornadiene (weight %) | divinylbenzene (weight %) | appearance of product material | % yield |
|---|---|---|---|---|---|---|
| 17 | 69 | 1 | 10 | 20 | glossy, hard, dark-brown solid, top is sticky and barely solid | 94 |
| 18 | 73 | 1 | 21 | 10 | glossy, dark-brown solid, hard on bottom, top is rubbery and brittle | 95 |
| 19 | 86 | 2 | 20 | 10 | very glossy, hard, dark-brown solid | 96 |
| 20 | 69 | 1 | 20 | 10 | glossy, hard, dark-brown solid, top is sticky and barely solid | 96 |

EXAMPLE 2

Preparation of Fish Oil Plastics by Polymerization of Fish Oil and Modified Fish Oil General. All $^1$H and $^{13}$C NMR spectra were recorded in CDCl$_3$ using a Varian Unity spectrometer at 300 MHz and 75.5 MHz, respectively. IR spectra were recorded on a BIORAD FTS-7 Infrared Spectrometer. UV-Visible spectra were obtained using a Shimadzu UV-2101PC Scanning Spectrophotometer. Thin-layer chromatography (TLC) was performed using commercially prepared 60 mesh silica gel plates (Whatman K6F). The plates were visualized using UV light (254 nm) or basic KMnO$_4$ solution [3 g KMnO$_4$+20 g K$_2$CO$_3$+5 mL NaOH (5%)+300 mL H$_2$O].

Thermal Analysis. Thermogravimetric analysis (TGA) data was collected using a Perkin Elmer TGA7 Thermogravimetric Analyzer. Temperature ranges of 50–500° C. were used with ramps of 20° C./min. Differential scanning calorimetry data was obtained using a Perkin Elmer Pyris 1 Differential Scanning Calorimeter. An initial heating of 100–500° C., a cool-down cycle, and a second heating from 100–500° C. were used for each sample. Temperature ramps of 20° C./min were used in both heating cycles.

Solid State CP MAS $^{13}$C NMR Cross-polarization magic angle spinning (CP MAS) $^{13}$C NMR was performed on solid polymer samples using a Bruker MSL 300 spectrometer. Samples were examined at 2 spinning frequencies (2.5 and 3.0 K) to differentiate between actual signals and spinning sidebands.

Gel Permeation Chromatography. Molecular weight measurements were performed using a Waters gel permeation system (410 refractive index detector) coupled with a Wyatt miniDAWN. Multiple angle laser light scattering (MALLS) or calibrated polystyrene standards (1.2×102–1.1×105) were used in determining the molecular weights. Three ultrastyragel columns (Waters HR 1, 4, and 5), tetrahydrofuran eluent, a flow rate of 1.0 mL/min., and an equilibration temperature of 40° C. . re used in performing the chromatography Reagents. All reagents obtained from commercial vendors were used as received unless otherwise noted. The Norway fish oil was supplied by Pronova Biocare (Bergen, Norway), and the Capelin fish oil was obtained from SR-Mjol HF (Reykjavik, Iceland). Divinylbenzene, norbornadiene, dicyclopentadiene, styrene, myrcene, phenol, linalool, b-citronellol, furfural, 4-vinylcyclohexene, 1,4-benzoquinone, 2-allylphenol, p-mentha-1,8-diene, faran, 1,2-dimethoxybenzene, bisphenol A, 1,3-cyclohexadiene, maleic anhydride, methyl acrylate, vinyl acetate, vinylidene chloride, acrylonitrile, methyl crotonate, acrolein, isoprene, dimethyl acetylenedicarboxylate, diallyl phthalate, boron trifluoride diethyl etherate, iron(III) chloride, and tin tetrachloride (anh.) ere obtained from Aldrich Chemical Co. (Milwaukee, Wis.). Aluminum chloride, zinc(II) chloride, titaniumtetrachloride, and concentrated sulfuric acid were purchased from Fisher Scientific (Fair Lawn, N.J.). Tin tetrachloride pentahydrate was obtained from Mallinckrodt Chemical Co. (St. Louis, Mo.).

Representative Procedure for the Polymerization of Fish Oil. All of the fish oil polymerization reactions were performed on a 2.0 g scale. The amount of each reactant used is reported as a weight percent. To 1.3 g (65%) of fish oil in a 2 dram vial (17×60 mm) was added 0.4 g (20%) of divinylbenzene and 0.2 g (10%) of norbornadiene. The reaction mixture was then stirred to ensure homogeneity prior to the addition of 0.1 g (5%) of BF$_3$.OEt$_2$. The resulting solution was vigorously stirred and sealed under a nitrogen atmosphere. The reaction was allowed to proceed at 25° C. for 1 d, and then 60° C. for 1 d, and finally 110° C. for 3 d to produce 1.94 g (97% yield) of a very hard, shiny, pressure-resistant, dark-brown polymer.

Representative Procedure for the Polymerization of Conjugated Fish Oil. All of the conjugated fish oil polymerization reactions were performed on a 2.0 g scale. The amount of each reactant used is reported as a weight percent. To 1.78 g (89%) of conjugated fish oil in a 2 dram vial (17×60 mm) was added 0.1 g (5%) of divinylbenzene and 0.1 g (5%) of norbornadiene. The reaction mixture was then stirred to ensure homogeneity prior to the addition of 0.02 g (1%) of BF$_3$.OEt$_2$. The resulting solution was vigorously stirred and sealed under a nitrogen atmosphere. The reaction was allowed to proceed at 25° C. for 1 d, and then 60° C. for 1 d, and finally 110° C. for 2 d to produce 1.92 g (96% yield)

of a hard, shiny, dark-brown polymer that gives slightly to applied pressure.

Extractions of Fish Oil Polymers. A 2 g fish oil polymer sample was extracted with 100 mL of refluxing solvent (mathylene chloride) using soxhlet extraction in air for 24–48 h. After extraction, the resulting solution was concentrated, and the soluble extract was isolated for further characterization. The remaining insoluble polymeric material was dried under vacuum prior to further analysis.

Work-up Procedure for NMP and DMF Extracts of Fish Oil Polymers. The 100 mL extracts were added to a mixture of saturated ammonium chloride (100 mL) and distilled water (50 mL) in a separatory funnel. The resulting solution was extracted 3 times with 70 mL of diethyl ether. The ether layers were combined and dried over $MgSO_4$ (anh.). Concentration of the dried ether solution produced a mixture of the desired extract and residual amounts of NMP or DMF. The extract was then purified by flash chromatography on a silica gel column using a 5:1 hexanes/ethyl acetate eluent system to produce a light-yellow oil.

Representative Procedure for the Polymerization of Expoxidized Fish Oil. To 1.96 g (98%) of 100% expoxidized Norway fish oil in a 2 dram vial (17×60 mm) was added 0.04 g of $BF_3.OEt_2$ at 0° C. The reaction was stirred and then sealed under an air atmosphere at 0° C. for 2 h. The reaction mixture was then allowed to slowly warm to room temperature and proceed at 25° C. for 22 h. The product was slurried in 125 mL of $CH_2Cl_2$, and the resulting slurry was concentrated to approximately 10–15 mL. Hexanes (200 mL) were added to the resulting dispersion with vigorous stirring for 1 h. The hexanes solution was cooled at 0° C. for 30 min. to produce 1.22 g (61% yield) of a white powdery solid.

Ruthenium-catalyzed Acyclic Diene Metathesis of Pronova Fish Oil. The ruthenium catalyst $(Cy_3P)_2Cl_2Ru=CHPh$ (0.002 g, 0.002 mmol, 0.1 mol %) is placed in a 50 mL Schlenk flask under argon atmosphere in a glove box. The Schlenk flask is then connected to a vacuum line, and the fish oil (1.742 g, 1.74 mmol) is added to the catalyst via a gas tight syringe under argon atmosphere. The reaction mixture is then placed under vacuum or argon atmosphere and stirred for 24 h at 55° C. The reactions are quenched by adding 18 mL of dichloromethane and 0.2 mL of ethyl vinyl ether.

A) Polymerization of Fish Oil

The Norway fish oil readily polymerized with divinylbenzene in the presence of $BF_3.OEt$ to form dark-colored thermoset polymers ranging from plastics to soft, rubbery materials (Table 13). The polymerization reactions were allowed to go for 3 days at 110° C. The mass recoveries for all of the $BF_3.OEt_2$-catalyzed polymerization reactions were nearly quantitative. When a catalyst load of 5 weight percent was used, 10% divinylbenzene produced a soft thermoset (entry 2). As the amount of divinylbenzene was increased, the thermoset products became harder and shinier in appearance (entries 3–6). If the amount of $BF_3.OEt_2$ used in the reaction was reduced to 1–2 weight percent, 15% divinylbenzene produced a soft, solid thermoset (entries 9, 15). The fish oil-divinylbenzene thermosets had physical properties similar to the soybean oil-divinylbenzene thermosets prepared by the same $BF_3.OEt_2$-catalyzed reactions.

Two additives may be polymerized with the Norway fish oil at the same time using this chemistry. The $BF_3.OEt_2$-catalyzed reaction between the Norway fish oil, divinylbenzene and norbornadiene produced dark-colored plastics that were shinier and much harder than the fish oil-divinylbenzene polymers (Table 14). These reactions were run at room temperature for 1 day, 60° C. for 1 day, and then 110° C. for 3 days because norbornadiene is quite volatile and the reactions were violently exothermic when they were immediately heated. 5% by weight norbornadiene and 10% by weight divinylbenzene produced solid polymeric materials (entries 3, 9, 15). Smaller amounts of additives resulted in the production of viscous, dark-colored oils. The hardest materials were produced from reactions with 10 weight percent norbornadiene and 20 weight percent divinylbenzene (entries 6, 12, 18). The fish oil-norbornadiene-divinylbenzene system generally produced harder and shinier thermosets than the soybean oil-norbornadiene-divinylbenzene system.

Dicyclopentadiene and divinylbenzene were simultaneously copolymerized with the Norway fish oil using $BF_3.OEt_2$ to produce dark-colored thermosets (Table 15). The hardest plastics were prepared using 10% by weight dicyclopentadiene and 20% by weight divinylbenzene (entries 6, 12, 18). The fish oil-dicyclopentadiene-divinylbenzene thermosets were more dense than the fish oil-norbornadiene-divinylbenzene materials, but less dense than the corresponding soybean oil polymers.

Many other additives were examined in the $BF_3.OEt_2$-catalyzed polymerization reactions of the Norway fish oil (Table 16). The copolymerization of furfural, divinylbenzene, and the Norway fish oil produced very hard, dark-colored thermosets in excellent overall mass recoveries (entries 2–4). Interestingly, p-benzoquinone and divinylbenzene polymerized with the Norway fish oil violently at room temperature to produce dark-colored polymeric materials (entries 7–10). The most interesting material was produced when 20% divinylbenzene and 10% p-mentha-1,8-diene were polymerized with the Norway fish oil using 5 weight percent $BF_3.OEt_2$ (entry 11). This reaction produced a very hard, shiny, dark-brown thermoset after being heated at 60° C. for one day and then 110° C. for 2 days. Furan and divinylbenzene were copolymerized with the Norway fish oil to produce very firm, dark-colored thermosets that were resistant to applied pressure (entries 13, 14).

The Capelin fish oil from Iceland was also polymerized using the $BF_3.OEt_2$ catalyst (Table 17). The lower number of double bonds in the Capelin fish oil is clearly evident in its polymerization chemistry. The Capelin fish oil reactions generally produced softer thermosets than the Norway fish oil reactions. However, reasonably hard thermosets were prepared from the Capelin fish oil using $BF_3.OEt_2$. The reaction of 30% by weight divinylbenzene with the Capelin fish oil produced a hard plastic when 1 or 5% by weight $BF_3.OEt_2$ was used (entries 2, 3). The copolymerization of 20% dicyclo-pentadiene and 10% divinylbenzene with the Capelin fish oil produced a dark-colored thermoset (entry 4). The copolymerization of the Capelin fish oil, 10% divinylbenzene, and 20% norbornadiene produced a homogeneous, dark-colored plastic that resisted applied pressure (entries 5, 6).

B) Polymerization of Conjugated Fish Oil

The 80–90% conjugation of fish oil using $[RhCl(PPh_3)_3]$, $(p-CH_3C_6H_4)_3P$, and $SnCl_2.2H_2O$ in ethanol solvent is described above.

The conjugated Norway fish oil reacted with divinylbenzene in the presence of BF3.OEt$_2$ to produce very hard, shiny, dark-colored thermosets (Table 18). The conjugated Norway fish oil is much more reactive in this chemistry than the native Norway fish oil. While the native Norway fish oil reactions were run for 3 days at 110° C. (Table 13), the conjugated Norway fish oil reactions were run at 60° C. for 1 day and then 110° C. for 2 days to avoid violent, exothermic reactions. A hard, shiny, pressure-resistant, dark-colored thermoset was produced using only 5% by weight divinylbenzene, 94% conjugated fish oil, and 1% BF$_3$.OEt$_2$ (entry 13). The product thermosets became shinier and more rigid as the amount of divinylbenzene additive was increased from 5–30% (entries 1–6). Extremely hard, light weight plastics were produced by polymerizing the conjugated Norway fish oil with 30% by weight divinylbenzene using 1, 2 or 5% BF$_3$.OEt$_2$ (entries 6, 12, 18). The conjugated fish oil-divinylbenzene thermosets were shinier and more rigid than the conjugated soybean oil-divinylbenzene copolymers. When small catalyst loads and low divinylbenzene concentrations were used, the conjugated fish oil polymerizations produced harder materials than the corresponding reactions of conjugated soybean oil.

Divinylbenzene and norbornadiene were simultaneously copolymerized with the conjugated Norway fish oil using BF$_3$.OEt$_2$ to produce light weight, extremely hard, dark-brown plastics (Table 19). As seen previously with the divinylbenzene system, the conjugated Norway fish oil seems to be much more reactive than the native Norway fish oil in its copolymerization with norbornadiene and divinylbenzene. While the reaction of the Norway fish oil with 5% norbornadiene, 5% divinylbenzene and 5% BF$_3$mOEt$_2$ produced only a soft, dark-colored gel (Table 14, entry 1), the same reaction with the conjugated Norway fish oil produced a shiny, hard, dark-colored thermoset in a 96% overall mass recovery (Table 19, entry 1). Very hard thermosets were prepared using 10% by weight norbornadiene, 20% by weight divinylbenzene, and 1, 2, or 5% BF$_3$.OEt$_2$ (entries 6, 12, 18). Interestingly, the rigidity of the conjugated fish oil-divinylbenzene-norbornadiene thermosets did not suffer as the catalyst load was decreased (entries 3, 9, 15). This system produced the hardest materials generated in this study.

The reaction of 85% by weight Norway fish oil, 5% dicyclopentadiene, 5% divinylbenzene, and 5% BF$_3$.OEt$_2$ produced a viscous oil (Table 15, entry 1), but the same reaction produced a hard, shiny, pressure-resistant, dark-colored thermoset when the conjugated Norway fish oil was used (Table 20, entry 3). The polymers appeared to become shinier and firmer as the amounts of additives were increased (entries 1–6). When the amounts of dicyclopentadiene and divinylbenzene were held constant, the appearance of the polymeric products did, not seem to change as the catalyst load was decreased (entries 3, 9, 15).

The conjugated Norway fish oil produced a soft, dark-colored rubber when it was reacted with 5% by weight dicyclopentadiene and 5% BF$_3$.OEt$_2$. Increasing the amounts of dicyclopentadiene used in these reactions improved the rigidity of the polymers. A soft, rubbery copolymer was produced by reacting the conjugated Norway fish oil with 10% by weight norbornadiene and 5% BF$_3$.OEt$_2$. The reactions between the conjugated Norway fish oil and dicyclopentadiene or norbornadiene were all run at 110° C. for 4 days.

A series of other additives were examined in the BF$_3$.OEt$_2$-catalyzed copolymerization reactions of the conjugated Norway fish oil. One very promising system is the copolymerization of conjugated Norway fish oil, divinylbenzene, and p-mentha-1,8-diene to produce very hard, light-weight plastics.

The conjugated Capelin fish oil was also more reactive in the BF3.OEt$_2$-catalyzed polymerization reactions. Thermosets prepared from the conjugated Capelin fish oil and divinylbenzene were harder than the materials produced by the same reactions with the native Capelin fish oil. The conjugated Capelin fish oil-norbornadiene-divinylbenzene copolymers were not as hard as those made with the conjugated Norway fish oil, but they are more rigid than the copolymers made from the native Capelin fish oil.

C) Effect of Various Catalysts

AlCl$_3$, SnCl$_4$.5H$_2$O, and ZnCl$_2$ all produced a heterogeneous mixture of a few solids surrounded by viscous oils when reacted with 65% by weight Norway fish oil and 30% divinylbenzene (Table 21, entries 2–4). The same reaction catalyzed by FeCl$_3$ produced a soft, cloudy solid with dark-colored layers on the top and bottom surfaces (entry 5). Titanium tetrachloride produced some hard, dark-colored solids that were surrounded by a dark-colored, viscous oil (entry 6). A soft, porous, dark-brown solid was produced when 5% by weight concentrated sulfuric acid was reacted with 65% Norway fish oil and 30% divinylbenzene (entry 7). When anhydrous SnCl$_4$ reacted with the Norway fish oil and divinylbenzene, a hard, brittle, dark-colored solid was produced that appeared to have a darker layer on the bottom (entry 8). A solution of BCl$_3$ in CH$_2$Cl$_2$ (1 M) produced a dark-brown, free-flowing oil when reacted with the Norway fish oil and divinylbenzene.

D) Thermal Analysis of the Bulk Fish Oil Thermosets

Thermogravimetric analysis (TGA) data was obtained for many of the fish oil copolymers (Table 22). The temperatures corresponding to 10% polymer weight loss were obtained under both nitrogen and air atmospheres for each polymer system. The percentage of polymer mass remaining at 400° C. was also noted for each thermoset. Most of the polymers lose 10% of their mass between 250–300° C. However, after the initial loss of 10–15% of polymer mass, the remaining polymeric material appears to be thermally stable up to 375–400° C., when decomposition begins. Many of the thermosets still possess 75–80% of their initial mass at 400° C. Most of the fish oil thermosets have equal thermal stability in nitrogen and in air. Interestingly, there appears to be little correlation between rigidity and thermal stability in these materials. The thermal stability of the polymers does not seem to be a function of the catalyst load used in the reaction. The thermal stability of the fish oil copolymers is comparable to polystyrene which loses 10% of its mass at 343° C.

Differential scanning calorimetry (DSC) was also used to examine the thermal properties of the fish oil thermosets. The DSC graphs indicated that these materials are highly crosslinked polymers that may continue to crosslink as they are heated during DSC analysis. As seen in the TGA data, decomposition was also noted in the DSC graphs between 400–500° C.

E) Solubility of the Fish Oil Thermosets

A complete solubility study was performed using the 65% conjugated Norway fish oil, 20% norbornadiene, 10% divinylbenzene, and 5% $BF_3.OEt_2$ copolymer (Table 23). Soxhlet extraction was used to determine the amount of soluble and insoluble polymeric material for each solvent. All of the extractions were allowed to proceed for 24 hours except for the tetrahydrofuran extraction which required 48 hours to thoroughly remove the soluble material from the polymer sample. Methylene chloride ($CH_2Cl_2$) and tetrahydrofuran (THF) both extracted approximately 20% of soluble material from the fish oil copolymer. When the polymer was prepared as a thin film, $CH_2Cl_2$ was only able to extract 13% of soluble material. N,N-Dimethylformamide (DMF) extracted 15% of soluble, dark-colored, viscous oil from the fish oil thermoset. The only other solvent capable of extracting a significant amount of material from the copolymer was 1-methyl-2-pyrrolidinone. Acetone was only able to extract 7% of soluble material from the bulk copolymer. The fish oil thermoset showed no solubility in water, methanol or 0.02 MKOH in ethanol. Interestingly, the fish oil copolymer was broken into small pieces by methanesulfonic acid and concentrated sulfuric acid, but the overall mass recoveries of copolymer were high.

After performing the initial solubility study on the conjugated Norway fish oil-norbornadiene-divinylbenzene copolymer, we extracted 10 other Norway fish oil thermosets using $CH_2Cl_2$, THF, and DMF (Table 24). The solubility data obtained from these extractions clearly show that tetrahydrofuran is the most effective solvent for removing the soluble material from the fish oil thermosets. After extracting the dark-colored fish oil copolymers with THF, the bulk copolymer broke down and insoluble orange flakes were left behind. In most cases, the $CH_2Cl_2$ and DMF removed approximately the same amount of soluble material from a given polymer.

When conjugated and native Norway fish oil thermosets having the same composition are compared, the conjugated Norway fish oil copolymer contains a smaller amount of soluble material (Table 24, entries 1, 2). Decreasing the amount of divinyl-benzene from 30 to 10% by weight in the conjugated Norway fish oil-divinylbenzene-$BF_3.OEt_2$ polymer system results in only small solubility differences in $CH_2Cl_2$ and tetrahydrofuran, but the solubility in DMF increases from 10 to 24% (entries 2, 3). Native Norway fish oil polymers containing dicyclopentadiene have more soluble material than those containing norbornadiene (entries 5,9). This relationship does not hold true for the conjugated fish oil polymers which seem to have similar amounts of soluble material (entries 6, 10).

Interestingly, the percentages of insoluble materials obtained from the $CH_2Cl_2$ extractions of the Norway fish oil thermosets (Table 24) correspond well with the percentages of bulk fish oil polymer remaining at 400° C. during TGA analysis (Table 22). For example, entry 6 in Table 18 for the 65% conjugated Norway fish oil, 20% norbornadiene, 10% divinylbenzene, and 5% $BF_3.OEt$, copolymer had 79% $CH_2Cl_2$ insolubles, and the same bulk polymer system in Table 16 (entry 6) retained 79% of its mass at 400° C. under a nitrogen atmosphere. This correlation holds true for many of the fish oil thermosets. The $CH_2Cl_2$ soluble material is apparently responsible for the initial 10–15% weight loss seen in the TGA data for the fish oil thermosets. Once the $CH_2Cl_2$ soluble material has been volatilized, the remaining polymer material is still reasonably thermally stable at 400° C.

A similar solubility study was performed on the Capelin fish oil thermosets using $CH_2Cl_2$ solvent. In general, the Capelin fish oil copolymers contained more soluble material than the Norway fish oil copolymers.

F) The Soluble Material from the Fish Oil Thermosets

The extractable materials from the fish oil thermosets are dark-colored oils. The $^1H$ and $^{13}C$ NMR analysis of these soluble oils indicates that they are in the triglyceride form. Free fatty acids were not detected in the soluble oil by IR spectroscopy, but the carbonyl stretch of the esters was detected. The fatty acid chains of the soluble triglyceride contain very few double bonds. The $^1H$ NMR spectra show very few vinylic hydrogens ($\delta 52.–5.5$ ppm), and the $^{13}C$ NMR spectra show a limited number of sp2 carbons in the alkene region ($\delta 120–140$ ppm). There are also no signs of unreacted additives in the $^1H$ or $^{13}C$ NMR spectra of the soluble materials. Attempts to determine the molecular weight of the soluble material by gel permeation chromatography (GPC) and by mass spectrometry have not been successful. Multiple angle laser light scattering (MALLS) and calibrated polystyrene standards were both used in attempting to obtain a molecular weight for the soluble material by GPC. Evidently, the molecular weight of the soluble material is high enough to reduce its volatility to the point where GC-MS analysis becomes difficult.

G) The Insoluble Material from the Fish Oil Thermosets

The insoluble materials produced by the extraction of the fish oil thermosets with $CH_2Cl_2$ and THF are very interesting materials. In most cases, these insoluble materials account for approximately 75% of the total mass of the bulk fish oil thermosets. The $CH_2Cl_2$ and THF insolubles are dark-brown and orange-colored flakes, respectively. The THF insoluble materials resulting from the extraction of the 65% conjugated Norway fish oil, 30% dicyclopentadiene, and 5% $BF_3.OEt_2$ copolymer were examined using solid state, magic angle spinning (MAS) $^{13}C$ NMR spectroscopy. The spectrum clearly showed the presence of ester carbonyls ($\delta 165–175$ ppm) and carbon-carbon double bonds ($\delta 120–140$ ppm). The presence of carbon-carbon double bonds in the insoluble materials could potentially make them processable through further crosslinking reactions. The THF insoluble materials from the 65% conjugated Norway fish oil, 30% divinylbenzene, and 5% $BF_3.OEt_2$ copolymer were also examined by solid state, MAS $^{13}C$ NMR. This data also confirms the presence of ester carbonyls and carbon-carbon double bonds, although the double bonds present are largely due to the incorporation of divinylbenzene in the copolymer.

Thermogravimetric analysis (TGA) data was obtained for the $CH_2Cl_2$ and THF insoluble materials obtained from the extractions of the fish oil thermosets (Table 25). In general, the insoluble materials show remarkable thermal stability. Most of the systems examined lost 10% of their polymer mass at temperatures near 420° C. The thermal stability of the insoluble materials is not directly related to the percentage of organic additives in the bulk polymer. For instance, the $CH_2Cl_2$ and THF insoluble materials from the 94% conjugated Norway fish oil, 5% divinylbenzene, and 1% $BF_3.OEt_2$ copolymer (entry 4) are more thermally stable than the $CH_2Cl_2$ and THF insoluble materials resulting from the 65% conjugated Norway fish oil, 20% norbornadiene, 10% divinylbenzene, and 5% $BF_3.OEt_2$ copolymer (entry 6). All of the insoluble materials appear to be more thermally stable in nitrogen than in air. The highest thermal stability recorded for the insoluble materials was a 10% weight loss at 456° C. under a nitrogen atmosphere for the THF insoluble materials from the 65% Norway fish oil, 30% divinylbenzene, and 5% $BF_3.OEt_2$ copolymer (entry 1). The $CH_2Cl_2$ insoluble materials obtained from the extractions of the Capelin fish oil thermosets are less thermally stable than the corresponding materials obtained from the Norway fish oil copolymers.

Differential scanning calorimetry (DSC) analysis of the insoluble materials resulting from the extractions of the fish oil thermosets produced the same results seen for the bulk fish oil thermosets. The insoluble materials appear to be highly crosslinked materials that do not possess thermal phase transitions. The DSC graphs indicate further crosslinking may be taking place as the temperature is ramped up during DSC analysis. The decomposition of the insoluble materials is also detected at temperatures above 450° C.

H) Polymerization of Expoxidized Norway Fish Oil

The complete epoxidation of fish oil using the Sharpless method has been described above. The polymerization of 95–98% by weight expoxidized fish oil with catalytic amounts of $BF_3.OEt_2$ produced light-colored, powdery polyethers that were relatively insoluble. Attempts to copolymerize the expoxidized Norway fish oil with divinylbenzene, dicyclopentadiene, and norbornadiene produced heterogeneous products. The expoxidized Norway fish oil was also copolymerized with THF in the presence of $BF_3.OEt_2$ to produce crumbly, light-brown solids.

The solubility of the polymers prepared from the copolymerization of the expoxidized Norway fish oil and tetrahydrofuran using $BF_3.OEt_2$ was examined. These materials were insoluble in methanol, acetone, DMF, THF, diethylether, dimethylsulfoxide, $CHCl_3$, and $CH_2Cl_2$.

Thermogravimetric analysis (TGA) data was obtained for some of the polymers made from the expoxidized Norway fish oil. Interestingly, copolymerization with THF did not significantly change the thermal stability of the polymers. The polymer prepared using 98% expoxidized Norway fish oil and 2% $BF_3.OEt_2$ underwent a 10% weight loss at 215° C. under a nitrogen atmosphere, and the 75% expoxidized Norway fish oil, 21% tetrahydrofuran, 4% $BF_3.OEt_2$ polymer lost 10% of its mass at 193° C. under a nitrogen atmosphere.

I) Further Characterizations of Fish Oil Plastics: Structure, Thermal, and Dynamic Mechanical Properties Additional DSC thermographs of the samples were recorded over the temperature range from 30° C. to 300° C., using a Perkin-Elmer Pyris DSC-7 purged with nitrogen. Runs were conducted at a heating rate of 20° C./min. Indium was used as a standard for temperature calibration. The sample weight was about 10 mg.

Dynamic mechanical data were obtained using a three point bending mode in a dynamic mechanical analyzer Pyris DMA-7e of Perkin-Elmer Ltd. Thin sheet specimens of 1 mm thickness and 2.5 mm depth were used, and the span width was 10 mm. The measurements were carried out at a heating rate of 3° C./min at 1 Hz.

A Perkin-Elmer pyris-7 thermogravimeter was used to measure the weight losses of the polymeric materials. The samples were heated from room temperature to 900° C. at a heating rate of 20° C./min purged with air.

FIG. 1 gives the comparison between a typical fish oil product and some commercial polymers. The reference materials are Perkin-Elmer epoxy, polystyrene (Grd#210, Huntsman Corp.) and polyethylene (Paxon 3205, Viskase Corp.) The glass transition temperature of the conjugated fish oil material is between 110±10° C., slightly above that of the polystyrene but lower than that of the epoxy used in this study. The modulus at room temperature is about $1 \times 10^9$ Pa, which is on the same order of magnitude as polyethylene. Due to their thermosetting nature, the fish oil plastics have significantly better properties at higher temperatures (T>200° C.) than those of the polymers tested.

Figure 2:
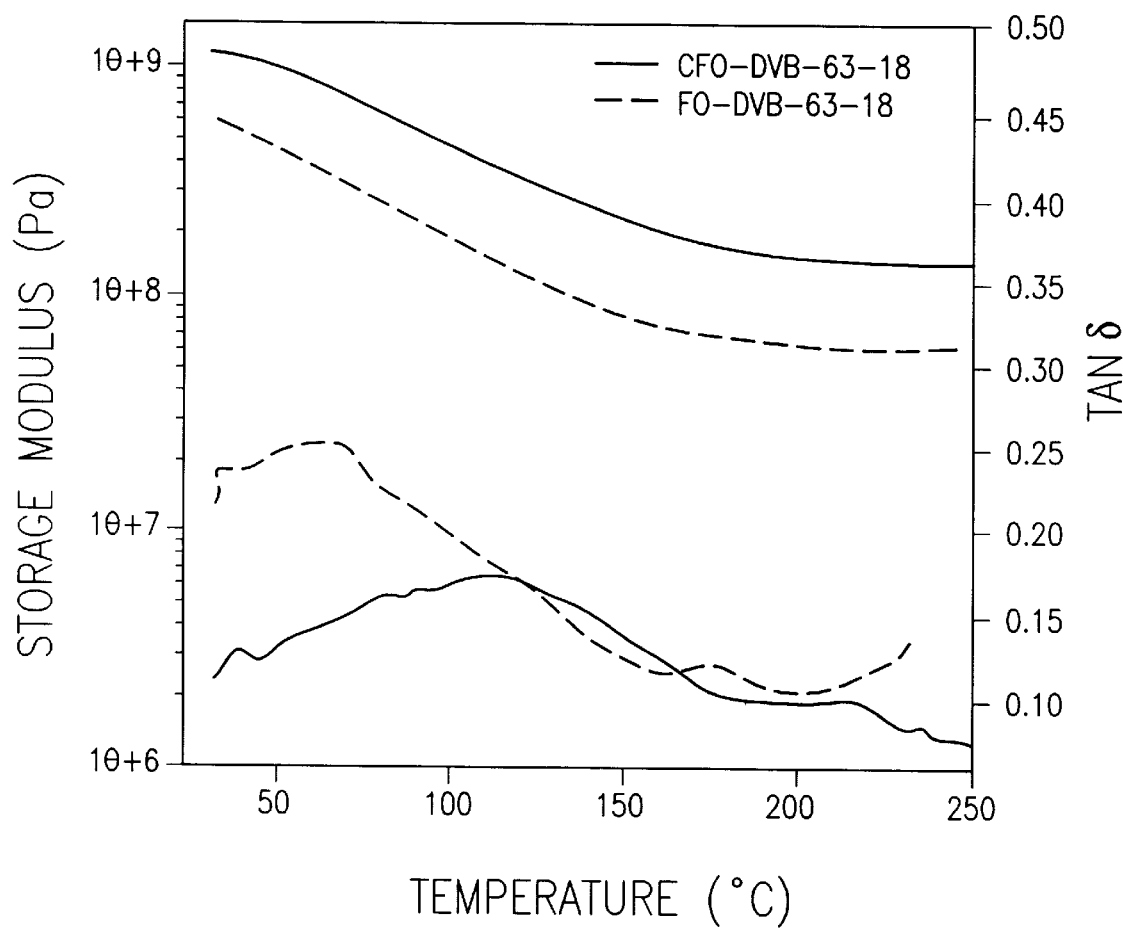
FIG. 2 depicts the temperature dependence of dynamic mechanical properties of fish oil plastics derived from natural fish oil and from conjugated fish oil.

FIG. 2 shows the temperature dependence of storage modulus and damping tans of the plastics based on native fish oil and its conjugated version, respectively. The nomenclature for the samples is as follows: FO and CFO represent fish oil and conjugated fish oil; DVB, NBD, and DCP denote divinylbenzene, norbornadiene and dicyclopentadiene, respectively. For example, CFO-DVB-DCP-62-18 corresponds to the sample based on conjugated fish oil with the comonomers of divinylbenzene and dicyclopentadiene; the weight percent of the oil is 62% and the mole percent is 18%. In the system with two comonomers, the mole ratio of DVB to NBD or DCP is 6. The modulus of conjugated fish oil plastics is evidently higher than that of the native oil counterparts over the whole temperature range. Appearance of an elastic plateau at high temperatures indicates the existence of good crosslinking structure in these materials. Generally a broad transition temperature range is observed from the damping behavior. Glass transition temperature, the maximum damping peak, of conjugated fish oil products is about 30° C.–50° C. higher than that of the native fish oil product. The glass transition temperatures of the polymers ranged from 50° to 130° C.

Figure 3:
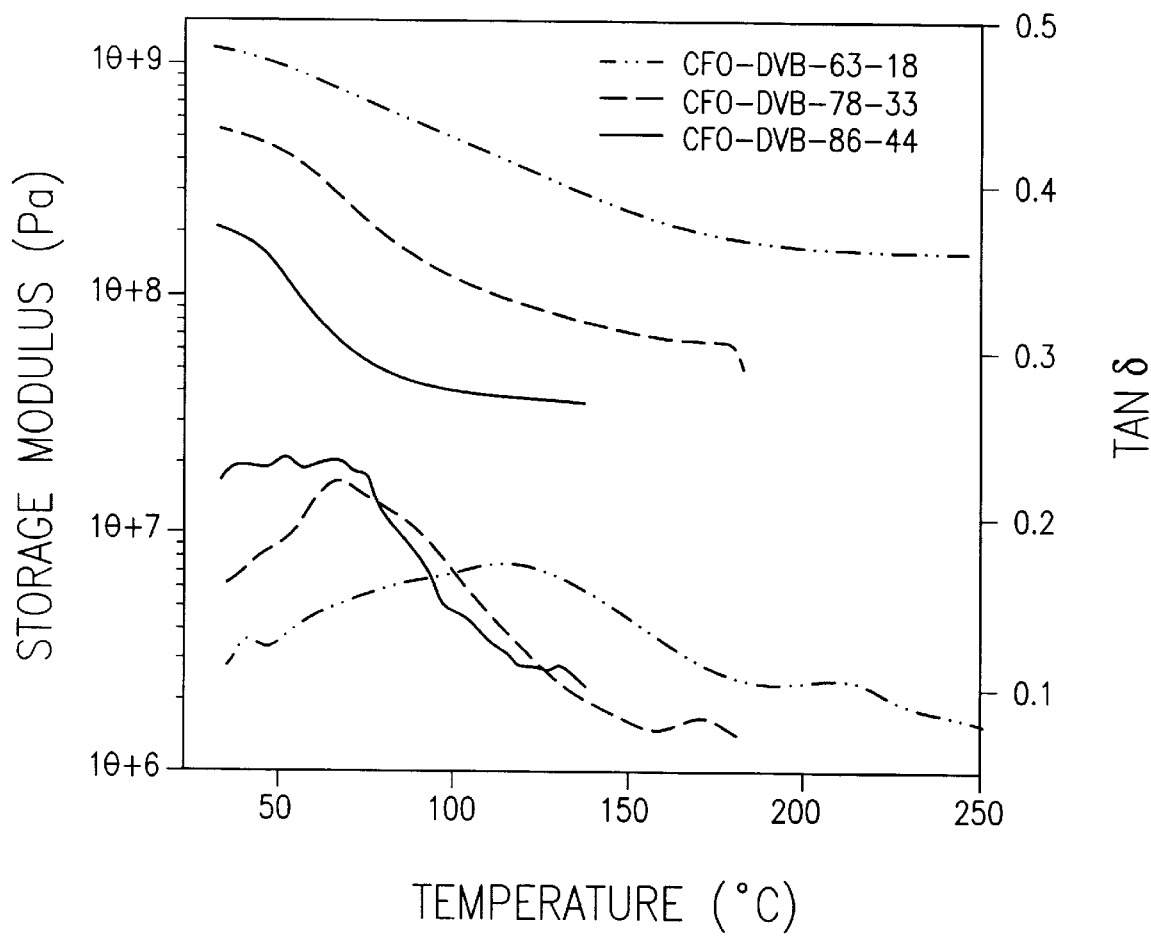
FIG. 3 depicts the temperature dependence of dynamic mechanical properties of fish oil plastics derived from the Lewis-acid catalyzed polymerization of conjugated fish oil and various amounts of comonomers.

FIG. 3 shows the DMA thermographs of conjugated fish oil samples with various amounts of comonomers. Evidently, the samples having more comonomers in their compositions display better thermal mechanical properties, i.e., high modulus and glass transition temperatures. The crosslinking structure is also better when more comonomers are employed.

Figure 4A:
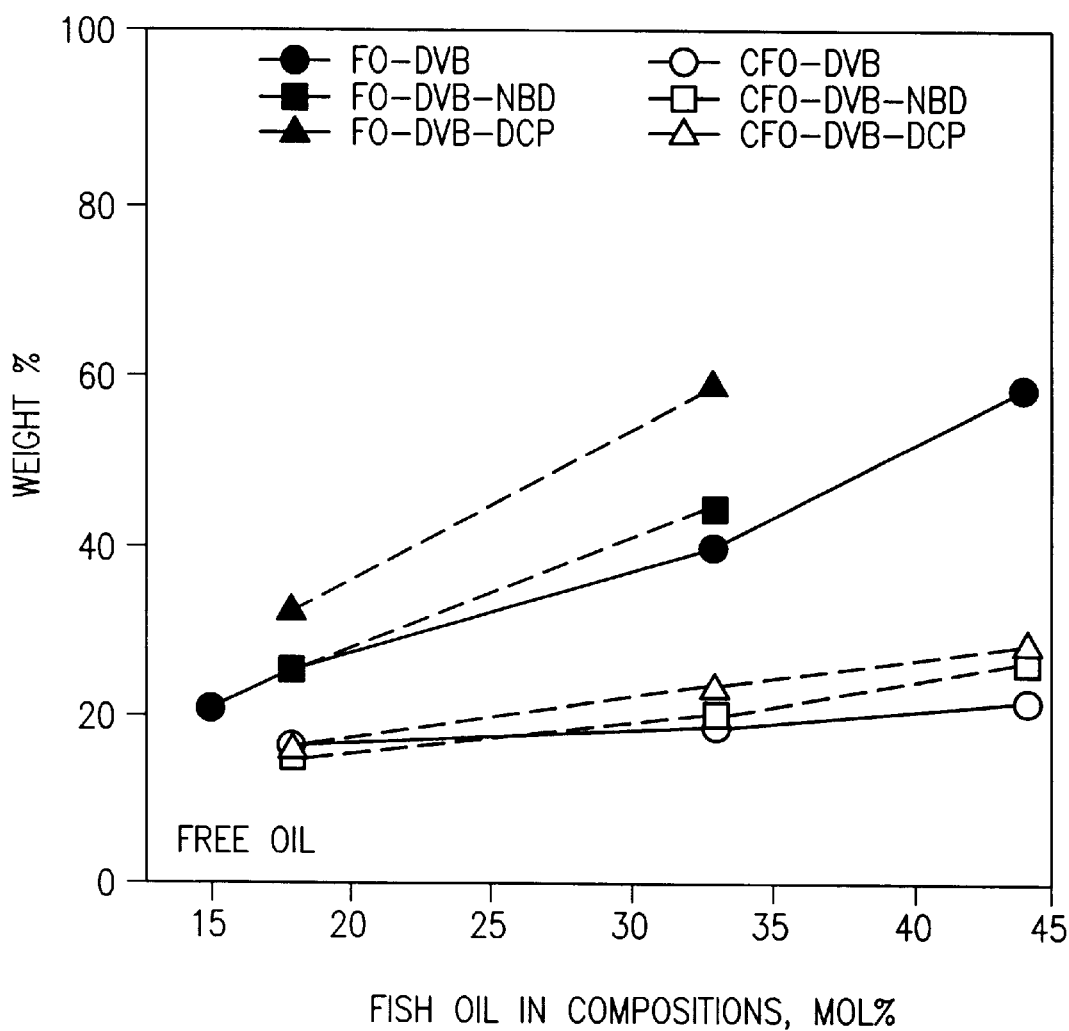
FIGS. 4a and 4b show un-reacted and reacted, respectively, fish oil fractions in natural fish oil and conjugated fish oil bulk polymers.

The variations in the properties are mainly attributed to the structures of thermosetting polymers. FIG. 4a shows that more free oil molecules exist in fish oil products than in conjugated fish oil counterparts. These free molecules likely have a plasticizing effect. The number of free oil molecules may decrease if more comonomers are added into the reaction mixtures.

Figure 4B:
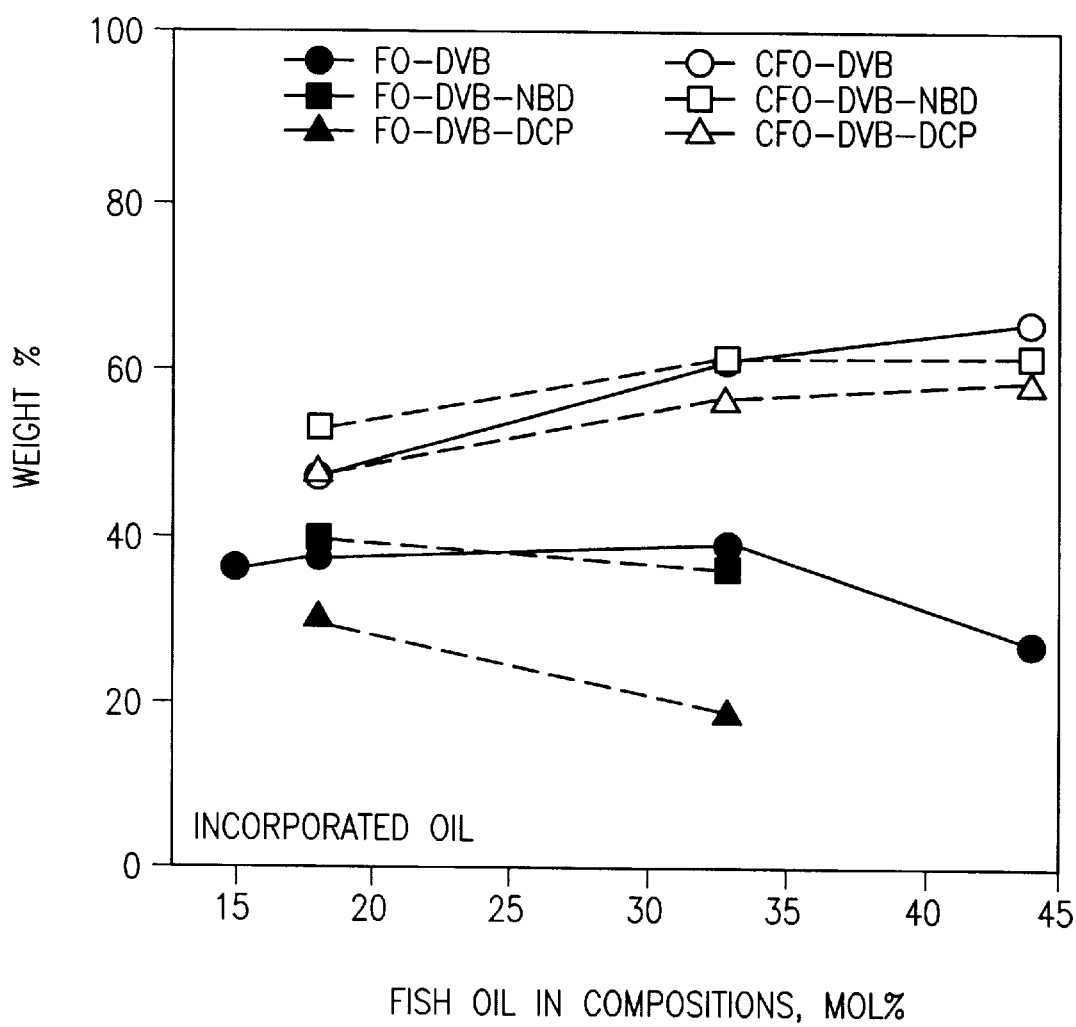

The number of incorporated oil molecules are also closely related to their compositions, as shown in FIG. 4b. Compared with native oil, conjugated fish oil can be efficiently consumed in the Lewis-acid catalysis reactions. These incorporated oil molecules typically contribute to about 20 mol % or less of the crosslink structure frameworks.

Figure 5:
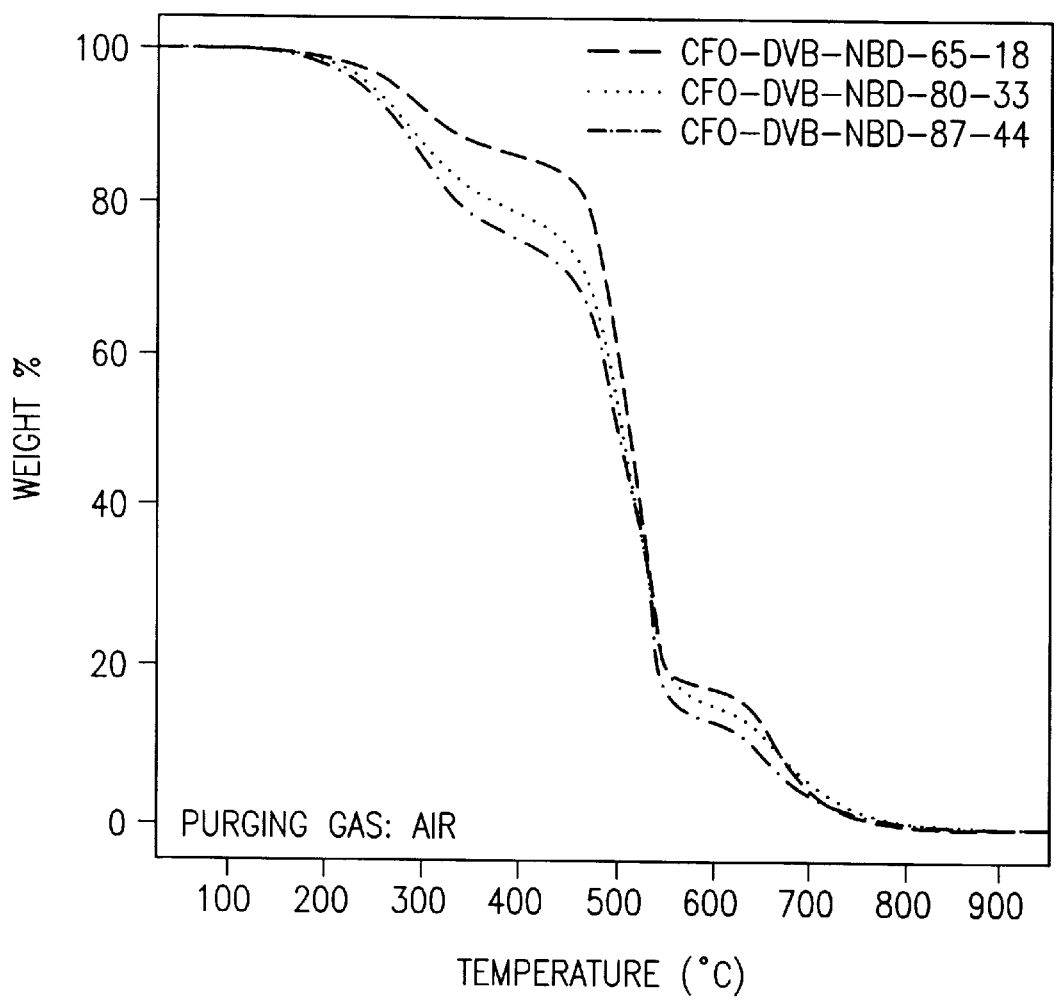
FIG. 5 shows thermogravimetric analyses (TGA) thermographs for various conjugated fish oil plastics prepared according to the method of the invention.

FIG. 5 shows the TGA thermographs of conjugated fish oil products purged in air. Generally, three distinct temperature regions are observed, i.e., 200° C.~400° C. 400°

C.~560° C., and 560° C.~800° C. It has been found that the first temperature region is mainly the evaporation of un-reacted free oil molecules in the bulk; the second, the decomposition of the crosslinking structure, and; the last step is the formation of carbons and subsequent oxidation of the residual carbons.

Figure 6A:
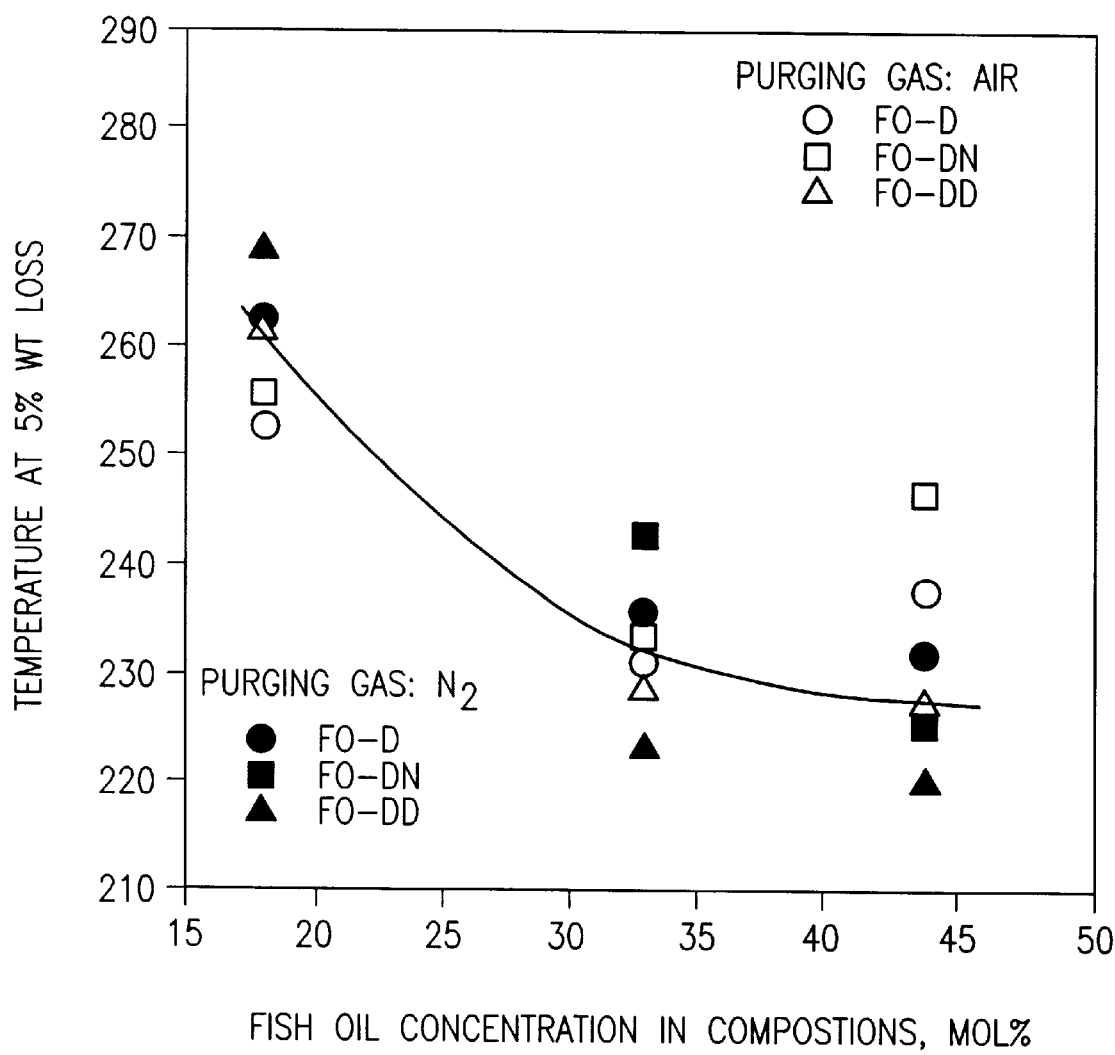
FIGS. 6a and 6b show temperatures at 5% weight loss as a function of fish oil concentration for natural, and for conjugated, fish oil plastics, respectively.
Figure 6B:
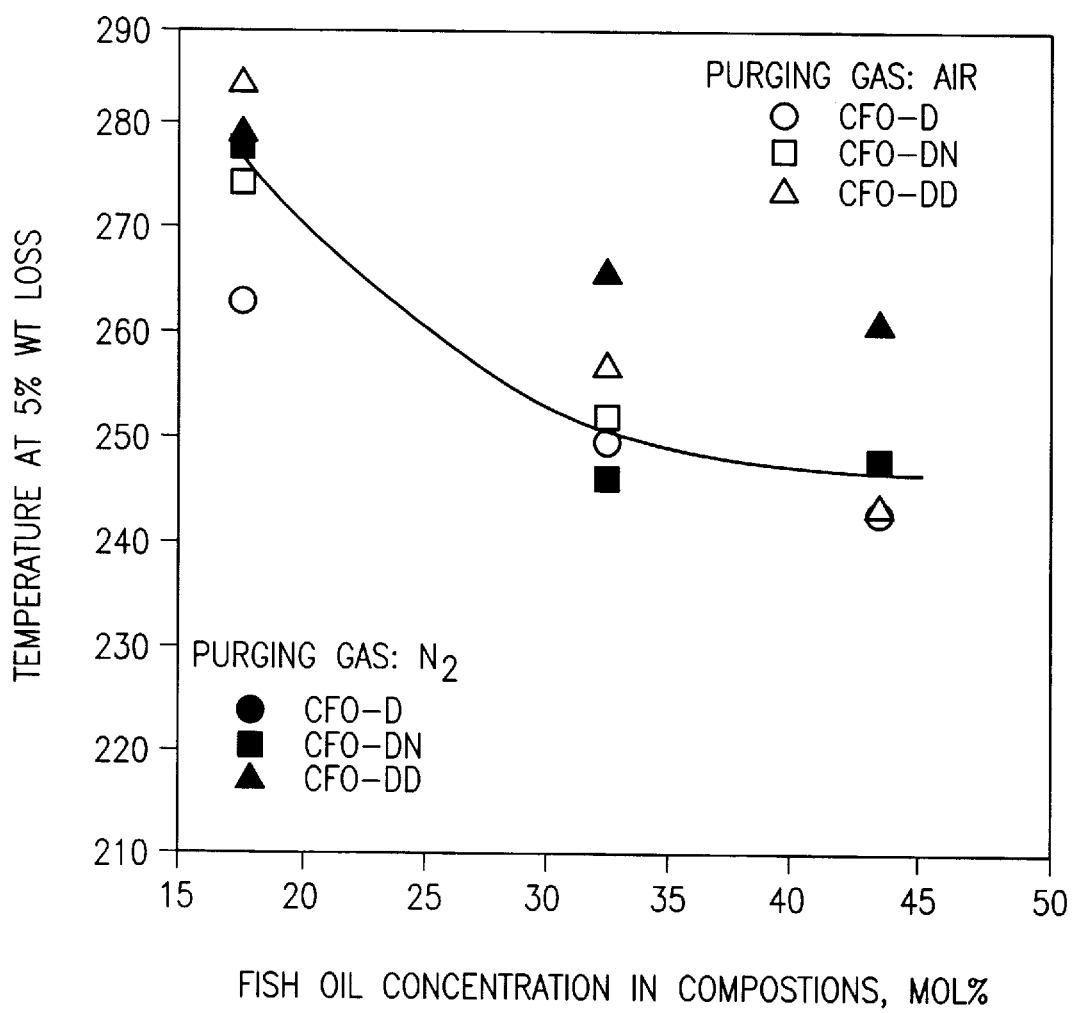

The un-reacted free oil substances play a key role in the thermal stability of these materials. The temperature at 5% weight loss for all the materials are shown in FIGS. 6a and 6b. Generally, the decomposition temperatures of conjugated fish oil polymers are higher than those of fish oil counterparts. This is consistent with the results of un-reacted free oil weight presence. The decreased presence of un-reacted free oil molecules gives the conjugated fish oil plastics improved mechanical properties and thermal stability.

TABLE 13

Polymerization of Norway Fish Oil and Divinylbenzene Using Boron Trifluoride Etherate

| Entry | % Fish Oil (weight %) | % BF$_3$ · OEt$_2$ (weight %) | % Divinylbenzene (weight %) | Observations | % Yield[a] |
|---|---|---|---|---|---|
| 1 | 90 | 5 | 5 | very viscous, flowing, dark-colored oil; did not set-up | (—) |
| 2 | 85 | 5 | 10 | soft, rubbery, tacky, dark-colored solid; gives freely to pressure | 98 |
| 3 | 80 | 5 | 15 | hard, rubbery, dark-colored solid; gives slightly to pressure | 99 |
| 4 | 75 | 5 | 20 | hard, shiny, dark-colored solid; gives slightly to pressure | 99 |
| 5 | 70 | 5 | 25 | very hard, shiny, dark-colored solid; resistant to pressure | 97 |
| 6 | 65 | 5 | 30 | very hard, shiny, dark-colored solid; resistant to pressure | 99 |
| 7 | 93 | 2 | 5 | viscous, dark-colored liquid; did not set-up | (—) |
| 8 | 88 | 2 | 10 | very soft, sticky, fragile, dark-colored solid; breaks apart easily | 97 |
| 9 | 83 | 2 | 15 | rubbery, firm, dark-colored solid; gives to pressure | 99 |
| 10 | 78 | 2 | 20 | hard, shiny, dark-colored solid; gives slightly to pressure | 99 |
| 11 | 73 | 2 | 25 | hard, shiny, dark-colored solid; resistant to pressure | 99 |
| 12 | 68 | 2 | 30 | very hard, shiny, dark-colored solid; resistant to pressure | 99 |
| 13 | 94 | 1 | 5 | dark-colored free-flowing liquid, not viscous | (—) |
| 14 | 89 | 1 | 10 | dark-colored free-flowing liquid, not viscous | (—) |
| 15 | 84 | 1 | 15 | soft, rubbery, dark-colored solid; gives freely to pressure | 99 |
| 16 | 79 | 1 | 20 | hard, dull-looking, dark-colored solid; gives slightly to pressure | 99 |
| 17 | 74 | 1 | 25 | very hard, shiny, dark-colored solid; resistant to pressure | 99 |
| 18 | 69 | 1 | 30 | very hard, shiny, dark-colored solid; resistant to pressure | 99 |

[a]All reactions were performed at 110° C. for 3 days.

TABLE 14

Polymerization of Norway Fish Oil, Divinylbenzene, and Norbornadiene Using Boron Trifluoride Etherate

| Entry | % Fish Oil (weight %) | % BF$_3$ · OEt$_2$ (weight %) | % Norbornadiene (weight %) | % Divinylbenzene (weight %) | Observations | % Yield[a] |
|---|---|---|---|---|---|---|
| 1 | 85 | 5 | 5 | 5 | sticky, soft, dark-colored gel; difficult to remove from vial | 77 |
| 2 | 80 | 5 | 10 | 5 | rubbery, tacky, shiny, dark-colored solid; gives to pressure | 97 |
| 3 | 80 | 5 | 5 | 10 | firm, tacky, dark-colored rubbery solid; gives slightly to pressure | 99 |
| 4 | 75 | 5 | 10 | 10 | hard, shiny, dark-colored solid; gives slightly to pressure | 96 |
| 5 | 65 | 5 | 20 | 10 | very hard, shiny, dark-colored solid; resistant to pressure | 96 |
| 6 | 65 | 5 | 10 | 20 | very hard, shiny, dark-colored solid; resistant to pressure | 97 |
| 7 | 88 | 2 | 5 | 5 | viscous, dark-colored liquid; did not set-up | (—) |

TABLE 14-continued

Polymerization of Norway Fish Oil, Divinylbenzene, and Norbornadiene Using Boron Trifluoride Etherate

| Entry | % Fish Oil (weight %) | % BF$_3$ · OEt$_2$ (weight %) | % Norbornadiene (weight %) | % Divinylbenzene (weight %) | Observations | % Yield[a] |
|---|---|---|---|---|---|---|
| 8 | 83 | 2 | 10 | 5 | very viscous, dark-colored liquid, flows slowly | (—) |
| 9 | 83 | 2 | 5 | 10 | very soft, tacky, dark-colored rubbery solid; gives to pressure | 97 |
| 10 | 78 | 2 | 10 | 10 | rubbery, dull-looking, dark-colored solid; gives to pressure | 95 |
| 11 | 68 | 2 | 20 | 10 | hard, shiny, dark-colored solid; gives a little to pressure | 94 |
| 12 | 68 | 2 | 10 | 20 | very hard, shiny, dark-colored solid; resistant to pressure | 99 |
| 13 | 89 | 1 | 5 | 5 | dark-colored liquid, free-flowing | (—) |
| 14 | 84 | 1 | 10 | 5 | dark-colored liquid, free-flowing | (—) |
| 15 | 84 | 1 | 5 | 10 | soft, rubbery, fragile, dark-colored solid; gives to pressure | 95 |
| 16 | 79 | 1 | 10 | 10 | soft, tacky, fragile, dark-colored solid; gives to pressure | 88 |
| 17 | 69 | 1 | 20 | 10 | very hard, shiny, dark-colored solid; gives very little to pressure | 99 |
| 18 | 69 | 1 | 10 | 20 | very hard, shiny, dark-colored solid; resistant to pressure | 99 |

[a]All reactions were run at 25° C. for 1 day, then 60° C. for 1 day, and finally 110° C. for 3 days.

TABLE 15

Polymerization of Norway Fish Oil, Divinylbenzene and Dicyclopentadiene Using Boron Trifluoride Etherate

| Entry | % Fish Oil (weight %) | % BF$_3$ · OEt$_2$ (weight %) | % Dicyclopentadiene (weight %) | % Divinylbenzene (weight %) | Observations | % Yield[a] |
|---|---|---|---|---|---|---|
| 1 | 85 | 5 | 5 | 5 | sticky, thick, dark-colored liquid | (—) |
| 2 | 80 | 5 | 10 | 5 | very soft, tacky, dark-colored solid | 86 |
| 3 | 80 | 5 | 5 | 10 | rubbery, dull-looking, dark-colored solid; gives to pressure | 98 |
| 4 | 75 | 5 | 10 | 10 | rubbery, dull-looking, dark-colored solid; gives to pressure | 96 |
| 5 | 65 | 5 | 20 | 10 | shiny, dark-colored solid; gives a little to pressure | 93 |
| 6 | 65 | 5 | 10 | 20 | very hard, shiny, dark-colored solid; pressure resistant | 98 |
| 7 | 88 | 2 | 5 | 5 | free-flowing, slightly viscous, dark-colored liquid | (—) |
| 8 | 83 | 2 | 10 | 5 | free-flowing, viscous, dark-colored liquid | (—) |
| 9 | 83 | 2 | 5 | 10 | soft, tacky, fragile, dark-colored solid | 95 |
| 10 | 78 | 2 | 10 | 10 | soft, rubbery, tacky, dark-colored solid; gives to pressure | 97 |
| 11 | 68 | 2 | 20 | 10 | rubbery, dull-looking, dark-colored solid; gives to pressure | 97 |
| 12 | 68 | 2 | 10 | 20 | very hard, shiny, dark-colored solid; resistant to pressure | 99 |
| 13 | 89 | 1 | 5 | 5 | free-flowing, dark-colored liquid | (—) |
| 14 | 84 | 1 | 10 | 5 | free-flowing, dark-colored liquid | (—) |
| 15 | 84 | 1 | 5 | 10 | very viscous, flowing, dark-colored liquid | (—) |
| 16 | 79 | 1 | 10 | 10 | tacky, gel-like, dark-colored solid | 87 |
| 17 | 69 | 1 | 20 | 10 | slightly tacky, rubbery, dull-looking, dark-colored solid | 92 |
| 18 | 69 | 1 | 10 | 20 | very shiny, hard, dark-colored solid; resistant to pressure | 99 |

[a]All reactions were performed at 60° C. for 1 day and then 110° C. for 2 days.

TABLE 16

Polymerization of Norway Fish Oil With Additives Using Boron Trifluoride Etherate

| Entry | % Fish Oil (weight %) | % BF$_3$ · OEt$_2$ (weight %) | % Additive 1 (weight %) | % Additive 2 (weight %) | Conditions | Observations | % Yield |
|---|---|---|---|---|---|---|---|
| 1 | 65 | 5 | 15 β-citronellol | 15 divinylbenzene | 110° C. 3 d | soft, tacky, rubbery, porous, dark-colored solid | 90 |
| 2 | 60 | 5 | 10 furfural | 25 divinylbenzene | 110° C. 3 d | very hard, dull-looking, dark-colored solid | 93 |
| 3 | 65 | 5 | 10 furfural | 20 divinylbenzene | 110° C. 3 d | very hard, dull-looking, dark-colored solid | 98 |
| 4 | 70 | 5 | 5 furfural | 20 divinylbenzene | 110° C. 3 d | very hard, shiny, dark-colored solid | 95 |
| 5 | 65 | 5 | 15 4-vinylcyclohexene | 15 divinylbenzene | 110° C. 3 d | very soft, dark-colored, sticky solid | 95 |
| 6 | 60 | 5 | 10 4-vinylcyclohexene | 25 divinylbenzene | 110° C. 3 d | hard, shiny, brown solid, cracks in surface | 97 |
| 7 | 65 | 5 | 15 ρ-benzoquinone | 15 divinylbenzene | 25° C. 20 min, 110° C. 3 d | hard, dark-colored solid; reacts violently | 90 |
| 8 | 60 | 5 | 10 ρ-benzoquinone | 25 divinylbenzene | 25° C. 20 min, 110° C. 3 d | hard, dark-colored solid; reacts violently | 99 |
| 9 | 75 | 5 | 10 ρ-benzoquinone | 10 divinylbenzene | 0° C. 15 min, 110° C. 3 d | hard, dark-colored, very dense solid | 97 |
| 10 | 65 | 5 | 10 ρ-benzoquinone | 20 divinylbenzene | 0° C. 15 min, 110° C. 1 d | very hard, dark-colored, brittle solid | 98 |
| 11 | 65 | 5 | 20 divinylbenzene | 10 p-mentha-1,8-diene | 60° C. 1 d, 110° C. 2 d | hard, shiny, dark-colored solid; resists pressure | 98 |
| 12 | 80 | 5 | 15 furan | (—) | 30° C. 3 d, 110° C. 8 d | dark-colored solid flakes mixed with viscous oil | 74 |
| 13 | 65 | 5 | 15 furan | 15 divinylbenzene | 30° C. 2 d, 110° C. 8 d | very hard, dark-colored solid; resistant to pressure | 85 |
| 14 | 70 | 5 | 10 furan | 15 divinylbenzene | 30° C. 1 d, 110° C. 6 d | hard, dark-colored, solid; gives slightly to pressure | 91 |
| 15 | 65 | 5 | 15 bisphenol A | 15 divinylbenzene | 110° C. 3 d | hard, tacky, dark-colored solid; cracked surface | 85 |
| 16 | 70 | 5 | 10 bisphenol A | 15 divinylbenzene | 110° C. 3 d | hard, tacky, dark-colored solid; cracked surface | 86 |
| 17 | 94 | 6 | (—) | (—) | 110° C. 3 d | viscous, free-flowing, dark-colored oil | (—) |
| 18 | 79 | 6 | 15 styrene | (—) | 110° C. 2 d | viscous, dark-colored oil, flows slowly | (—) |
| 19 | 62 | 6 | 13 styrene | 19 dicyclopentadiene | 110° C. 2 d | dark-brown, very viscous oil, flows slowly | (—) |
| 20 | 74 | 6 | 20 myrcene | (—) | 110° C. 2 d | dark-colored, free-flowing oil | (—) |
| 21 | 80 | 5 | 15 phenol | (—) | 110° C. 3 d | dark-colored, free-flowing oil | (—) |
| 22 | 65 | 5 | 15 phenol | 15 norbornadiene | 110° C. 3 d | dark-colored, slow-flowing, viscous oil | (—) |
| 23 | 65 | 5 | 15 (+)-linalool | 15 divinylbenzene | 110° C. 3 d | dark-colored, slow-flowing, viscous oil | (—) |
| 24 | 80 | 5 | 15 furfural | (—) | 110° C. 3 d | very viscous, dark-colored oil | (—) |
| 25 | 65 | 5 | 15 furfural | 15 divinylbenzene | 110° C. 3 d | very viscous, dark-colored oil | (—) |
| 26 | 85 | 5 | 10 ρ-benzoquinone | (—) | 110° C. 3 d | very viscous, dark-colored oil | (—) |
| 27 | 65 | 5 | 15 ρ-benzoquinone | 15 myrcene | 0° C. 15 min, 110° C. 3 d | very viscous, gel-like, dark-colored oil, flows slowly | (—) (—) |
| 28 | 80 | 5 | 15 2-allylphenol | (—) | 110° C. 3 d | dark-colored, slightly viscous oil, flows slowly | (—) |
| 29 | 65 | 5 | 15 2-allylphenol | 15 divinylbenzene | 110° C. 3 d | very viscous, dark-colored oil, flows slowly | (—) |
| 30 | 85 | 5 | 5 divinylbenzene | 5 ρ-mentha-1,8-diene | 60° C. 1 d, 110° C. 2 d | very viscous, dark-colored oil | (—) |
| 31 | 80 | 5 | 15 1,2-dimethoxybenzene | (—) | 110° C. 5 d | dark-colored, viscous oil | (—) |
| 32 | 65 | 5 | 15 1,2-dimethoxybenzene | 15 divinylbenzene | 110° C. 5 d | dark-colored, very viscous oil | (—) |
| 33 | 70 | 5 | 15 1,2-dimethoxybenzene | 15 divinylbenzene | 110° C. 5 d | dark-colored, viscous oil | (—) |
| 34 | 80 | 5 | 15 bisphenol A | (—) | 110° C. 4 d | dark-colored, viscous oil | (—) |

TABLE 17

Polymerization of Capelin Fish Oil With Additives Using Boron Trifluoride Etherate

| Entry | % Fish Oil (weight %) | % BF$_3$ · OEt$_2$ (weight %) | % Additive 1 (weight %) | % Additive 2 (weight %) | Conditions | Observations | % Yield |
|---|---|---|---|---|---|---|---|
| 1 | 95 | 5 | (—) | (—) | 110° C. 3 d | dark-colored, free-flowing oil | (—) |
| 2 | 65 | 5 | 30 divinylbenzene | (—) | 110° C. 6 d | very hard, dark-colored solid; resistant to pressure | 99 |
| 3 | 69 | 1 | 30 divinylbenzene | (—) | 110° C. 6 d | very hard, dark-colored solid; resistant to pressure | 99 |
| 4 | 65 | 5 | 20 dicylopentadiene | 10 divinylbenzene | 60° C. 1 d, 110° C. 4 d | hard, dark-colored solid, harder on top than on the bottom | 99 |
| 5 | 65 | 5 | 20 norbornadiene | 10 divinylbenzene | 25° C. 1 d, 60° C. 1 d, 110° C. 3 d | hard, dark-colored solid; gives slightly to pressure | 98 |
| 6 | 69 | 1 | 20 norbornadiene | 10 divinylbenzene | 25° C. 1 d, 60° C. 1 d, 110° C. 3 d | hard, dark-colored solid; gives slightly to pressure | 98 |

TABLE 18

Polymerization of Conjugated Norway Fish Oil and Divinylbenzene Using Boron Trifluoride Etherate

| Entry | % Conjugated Fish Oil (weight %) | % BF$_3$ · OEt$_2$ (weight %) | % Divinylbenzene (weight %) | Observations | % Yield[a] |
|---|---|---|---|---|---|
| 1 | 90 | 5 | 5 | dark-colored, shiny, hard, rubbery solid; gives slightly to pressure | 97 |
| 2 | 85 | 5 | 10 | dark-colored, shiny, hard, rubbery solid; gives slightly to pressure | 97 |
| 3 | 80 | 5 | 15 | dark-colored, shiny, very hard solid; resistant to pressure | 97 |
| 4 | 75 | 5 | 20 | dark-colored, shiny, very hard solid; resistant to pressure | 97 |
| 5 | 70 | 5 | 25 | dark-colored, shiny, very hard solid; resistant to pressure | 97 |
| 6 | 65 | 5 | 30 | dark-colored, quite shiny, very hard solid; resistant to pressure | 99 |
| 7 | 93 | 2 | 5 | dark-colored, shiny, hard, rubbery solid; gives slightly to pressure | 98 |
| 8 | 88 | 2 | 10 | dark-colored, shiny, quite hard solid; resistant to pressure | 99 |
| 9 | 83 | 2 | 15 | dark-colored, shiny, quite hard solid; resistant to pressure | 97 |
| 10 | 78 | 2 | 20 | dark-colored, shiny, hard solid; resists pressure | 98 |
| 11 | 73 | 2 | 25 | dark-colored, shiny, very hard solid; resists pressure | 98 |
| 12 | 68 | 2 | 30 | dark-colored, shiny, very hard solid; resists pressure | 99 |
| 13 | 94 | 1 | 5 | dark-colored, shiny, hard, rubbery solid; gives to extreme pressure | 98 |
| 14 | 89 | 1 | 10 | dark-colored, shiny, hard, rubbery solid; gives to extreme pressure | 99 |
| 15 | 84 | 1 | 15 | dark-colored, shiny, hard solid; resistant to pressure | 99 |
| 16 | 79 | 1 | 20 | dark-colored, shiny, hard solid; resistant to pressure | 99 |
| 17 | 74 | 1 | 25 | dark-colored, shiny, hard solid; resistant to pressure | 98 |
| 18 | 69 | 1 | 30 | dark-colored, shiny, very hard solid; resists pressure | 100 |

[a]All reactions were run at 60° C. for 1 day and then 110° C. for 2 days.

TABLE 19

Polymerization of Conjugated Norway Fish Oil, Divinylbenzene and Norbornadiene Using Boron Trifluoride Etherate

| Entry | % Conjugated Fish Oil (weight %) | % BF$_3$ · OEt$_2$ (weight %) | % Norbornadiene (weight %) | % Divinylbenzene (weight %) | Observations | % Yield[a] |
|---|---|---|---|---|---|---|
| 1 | 85 | 5 | 5 | 5 | dark-colored, shiny, hard solid; gives slightly to pressure | 96 |
| 2 | 80 | 5 | 10 | 5 | dark-colored, shiny, hard solid; resistant to pressure | 97 |
| 3 | 80 | 5 | 5 | 10 | dark-colored, shiny, hard solid; resistant to pressure | 96 |
| 4 | 75 | 5 | 10 | 10 | dark-colored, shiny, very hard solid; resists pressure | 97 |
| 5 | 65 | 5 | 20 | 10 | dark-colored, shiny, extremely hard solid; resists pressure | 96 |
| 6 | 65 | 5 | 10 | 20 | dark-colored, shiny, extremely hard solid; resists pressure | 99 |
| 7 | 88 | 2 | 5 | 5 | dark-colored, shiny, hard solid; gives slightly to pressure | 98 |
| 8 | 83 | 2 | 10 | 5 | dark-colored, shiny, hard solid; gives very little to pressure | 97 |
| 9 | 83 | 2 | 5 | 10 | dark-colored, shiny, rigid solid; gives to extreme pressure | 98 |
| 10 | 78 | 2 | 10 | 10 | dark-colored, shiny, very hard solid; resists pressure | 98 |
| 11 | 68 | 2 | 20 | 10 | dark-colored, quite hard, shiny solid; resists pressure | 98 |
| 12 | 68 | 2 | 10 | 20 | dark-colored, shiny, extremely hard solid; resists pressure | 99 |
| 13 | 89 | 1 | 5 | 5 | dark-colored, slightly shiny, hard solid; gives to pressure | 96 |
| 14 | 84 | 1 | 10 | 5 | dark-colored, shiny, hard solid; gives slightly to pressure | 99 |
| 15 | 84 | 1 | 5 | 10 | dark-colored, shiny, hard solid; resistant to pressure | 97 |
| 16 | 79 | 1 | 10 | 10 | dark-colored, shiny, very hard solid; resistant to pressure | 97 |
| 17 | 69 | 1 | 20 | 10 | dark-colored, shiny, very hard solid; resistant to pressure | 96 |
| 18 | 69 | 1 | 10 | 20 | dark-colored, shiny, extremely hard solid; resists pressure | 99 |

[a]All reactions were run at 25° C. for 1 day, then 60° C. for 1 day, and finally 110° C. for 2 days.

TABLE 20

Polymerization of Conjugated Norway Fish Oil, Divinylbenzene, and Dicyclopentadiene Using Boron Trifluoride Etherate

| Entry | % Conjugated Fish Oil (weight %) | % BF$_3$ · OEt$_2$ (weight %) | % Dicyclopentadiene (weight %) | % Divinylbenzene (weight %) | Observations | % Yield[a] |
|---|---|---|---|---|---|---|
| 1 | 85 | 5 | 5 | 5 | hard, shiny, dark-colored solid; gives slightly to pressure | 97 |
| 2 | 80 | 5 | 10 | 5 | hard, shiny, dark-colored solid; gives slightly to pressure | 97 |
| 3 | 80 | 5 | 5 | 10 | hard, shiny, dark-colored solid; resists pressure | 97 |
| 4 | 75 | 5 | 10 | 10 | very hard, shiny, dark-colored solid; pressure resistant | 96 |
| 5 | 65 | 5 | 20 | 10 | very hard, shiny, dark-colored solid; pressure resistant | 95 |
| 6 | 65 | 5 | 10 | 20 | very hard, shiny, dark-colored solid; pressure resistant | 99 |
| 7 | 88 | 2 | 5 | 5 | shiny, rubbery, dark-colored solid; gives to pressure | 96 |
| 8 | 83 | 2 | 10 | 5 | shiny, rubbery, dark-colored solid; gives to pressure | 97 |
| 9 | 83 | 2 | 5 | 10 | hard, shiny, dark-colored solid; gives slightly to pressure | 97 |
| 10 | 78 | 2 | 10 | 10 | hard, shiny, dark-colored solid; gives slightly to pressure | 97 |
| 11 | 68 | 2 | 20 | 10 | very hard, shiny, dark-colored solid; pressure resistant | 94 |

TABLE 20-continued

Polymerization of Conjugated Norway Fish Oil, Divinylbenzene, and Dicyclopentadiene Using Boron Trifluoride Etherate

| Entry | % Conjugated Fish Oil (weight %) | % BF$_3$ · OEt$_2$ (weight %) | % Dicyclopentadiene (weight %) | % Divinylbenzene (weight %) | Observations | % Yield[a] |
|---|---|---|---|---|---|---|
| 12 | 68 | 2 | 10 | 20 | very hard, shiny, dark-colored solid; pressure resistant | 99 |
| 13 | 89 | 1 | 5 | 5 | firm, rubbery, dark-colored solid; gives slightly to pressure | 92 |
| 14 | 84 | 1 | 10 | 5 | firm, rubbery, dark-colored solid; gives slightly to pressure | 90 |
| 15 | 84 | 1 | 5 | 10 | hard, shiny, dark-colored solid; gives slightly to pressure | 96 |
| 16 | 79 | 1 | 10 | 10 | hard, shiny, dark-colored solid; gives slightly to pressure | 93 |
| 17 | 69 | 1 | 20 | 10 | hard, shiny, dark-colored solid; gives to extreme pressure | 93 |
| 18 | 69 | 1 | 10 | 20 | very hard, shiny, dark-colored solid; resistant to pressure | 99 |

[a]All reactions were run at 60° C. for 1 day and then 110° C. for 2 days.

TABLE 21

Polymerization of Norway Fish Oil and Divinylbenzene Using Lewis Acid Catalysts

| Entry | % Fish Oil (weight %) | 5% Catalyst (weight %) | % Divinylbenzene (weight %) | Observations | % Yield[a] |
|---|---|---|---|---|---|
| 1 | 65 | BF$_3$ · OEt$_2$ | 30 | very hard, shiny, dark-colored solid, resistant to pressure | 99 |
| 2 | 65 | AlCl$_3$ | 30 | heterogeneous mixture of dark-brown solids and a free-flowing oil | (—) |
| 3 | 65 | SnCl$_4$ · 5H$_2$O | 30 | heterogeneous mixture of dark-brown solids surrounded by a viscous oil | 87 |
| 4 | 65 | ZnCl$_2$ | 30 | heterogeneous mixture of brown solids surrounded by a viscous oil | 93 |
| 5 | 65 | FeCl$_3$ | 30 | cloudy, soft, fragile solid with dark-colored layers on the top and bottom | 92 |
| 6 | 65 | TiCl$_4$ | 30 | hard, tacky, dark-brown solids surrounded by a viscous oil | 96 |
| 7 | 65 | H$_2$SO$_4$ | 30 | soft, tacky, porous, dark-brown solid, harder on the bottom than on top | 96 |
| 8 | 65 | SnCl$_4$ (anh.) | 30 | hard, brittle, dark-colored solid, darker on the bottom than on top | 99 |
| 9 | 65 | BCl$_3$ (1 M in CH$_2$Cl$_2$) | 30 | dark-brown, free-flowing oil | (—) |

[a]All reactions were run at 110° C. for 3 days.

TABLE 22

Thermogravimetric Analysis of Fish Oil Polymers

| | | TGA[a] | | | |
|---|---|---|---|---|---|
| Entry | Polymer | T$_{N2}$ (° C.) | % Mass$_{N2}$[b] (400° C.) | T$_{air}$ (° C.) | % Mass$_{air}$[b] (400° C.) |
| 1 | 65% Norway Fish Oil 30% Divinylbenzene 5% BF$_3$ · OEt$_2$ | 265 | 72 | 269 | 74 |
| 2 | 65% Conjugated Norway Fish Oil 30% Divinylbenzene 5% BF$_3$ · OEt$_2$ | 239 | 76 | 271 | 79 |
| 3 | 85% Conjugated Norway Fish Oil 10% Divinylbenzene 5% BF$_3$ · OEt$_2$ | 284 | 75 | 283 | 76 |
| 4 | 94% Conjugated Norway Fish Oil 5% Divinylbenzene 1% BF$_3$ · OEt$_2$ | 238 | 65 | 245 | 67 |

TABLE 22-continued

Thermogravimetric Analysis of Fish Oil Polymers

| Entry | Polymer | $T_{N2}$ (° C.) | % Mass$_{N2}$[b] (400° C.) | $T_{air}$ (° C.) | % Mass$_{air}$[b] (400° C.) |
|---|---|---|---|---|---|
| 5 | 65% Norway Fish Oil<br>20% Norbornadiene<br>10% Divinylbenzene<br>5% BF$_3$ · OEt$_2$ | 234 | 74 | 234 | 76 |
| 6 | 65% Conjugated Norway Fish Oil<br>20% Norbornadiene<br>10% Divinylbenzene<br>5% BF$_3$ · OEt$_2$ | 244 | 79 | 231 | 80 |
| 7 | 69% Norway Fish Oil<br>20% Norbornadiene<br>10% Divinylbenzene<br>1% BF$_3$ · OEt$_2$ | 249 | 76 | 254 | 79 |
| 8 | 50% Conjugated Norway Fish Oil<br>30% Norbornadiene<br>15% Divinylbenzene<br>5% BF$_3$ · OEt$_2$ | 334 | 87 | 338 | 87 |
| 9 | 89% Conjugated Norway Fish Oil<br>5% Norbornadiene<br>5% Divinylbenzene<br>1% BF$_3$ · OEt$_2$ | 249 | 67 | 246 | 70 |
| 10 | 65% Norway Fish Oil<br>20% Dicyclopentadiene<br>10% Divinylbenzene<br>5% BF$_3$ · OEt$_2$ | 285 | 77 | 290 | 79 |
| 11 | 65% Conjugated Norway Fish Oil<br>20% Dicyclopentadiene<br>10% Divinylbenzene<br>5% BF$_3$ · OEt$_2$ | 226 | 72 | 239 | 76 |
| 12 | 65% Conjugated Capelin Fish Oil<br>30% Divinylbenzene<br>5% BF$_3$ · OEt$_2$ | 253 | 60 | 245 | 57 |
| 13 | 65% Conjugated Capelin Fish Oil<br>20% Norbornadiene<br>10% Divinylbenzene<br>5% BF$_3$ · OEt$_2$ | 274 | 72 | 282 | 76 |

[a]The TGA temperature ramp used was 20° C./min.
[b]The bulk polymer mass remaining at 400° C.

TABLE 23

Solubility of the 65% Conjugated Norway Fish Oil, 20% Norbornadiene, 10% Divinylbenzene, and 5% BF$_3$.OEt$_2$ Polymer in Various Solvent Systems

| Solvent | Time (h) | Temp. (° C.) | % Insoluble | % Soluble |
|---|---|---|---|---|
| THF | 48 | 66 | 75 | 23 |
| CH$_2$Cl$_2$ | 24 | 40 | 79 | 17 |
| 1-Methyl-2-pyrrolidinone | 24 | 150 | 78 | 17 |
| DMF | 24 | 153 | 83 | 15 |
| CH$_2$Cl$_2$ (thin film) | 24 | 40 | 86 | 13 |
| Acetone | 24 | 56 | 93 | 7 |
| MeOH | 24 | 65 | 99 | — |
| Methanesulfonic Acid | 24 | 150 | 94 | — |
| H$_2$O | 24 | 100 | 99 | — |
| Conc. H$_2$SO$_4$ | 24 | 25 | 95 | — |
| EtOH (0.02 M KOH) | 24 | 79 | 95 | — |

TABLE 24

Solubilities of Norway Fish Oil Polymers in CH$_2$Cl$_2$, THF, and DMF

| Entry | Polymer | Solvent | Time (h) | Temp. (° C.) | % Insoluble | % Soluble |
|---|---|---|---|---|---|---|
| 1 | 65% Fish Oil | CH$_2$Cl$_2$ | 24 | 40 | 58 | 37 |
|   | 30% Divinylbenzene | THF | 48 | 66 | 65 | 32 |
|   | 5% BF$_3$ · OEt$_2$ | DMF | 24 | 153 | 66 | 27 |
| 2 | 65% Conjugated Fish Oil | CH$_2$Cl$_2$ | 24 | 40 | 77 | 19 |
|   | 30% Divinylbenzene | THF | 48 | 66 | 78 | 19 |
|   | 5% BF$_3$ · OEt$_2$ | DMF | 48 | 153 | 84 | 10 |
| 3 | 85% Conjugated Fish Oil | CH$_2$Cl$_2$ | 24 | 40 | 74 | 22 |
|   | 10% Divinylbenzene | THF | 72 | 66 | 72 | 26 |
|   | 5% BF$_3$ · OEt$_2$ | DMF | 48 | 153 | 68 | 24 |
| 4 | 94% Conjugated Fish Oil | CH$_2$Cl$_2$ | 24 | 40 | 64 | 31 |
|   | 5% Divinylbenzene | THF | 48 | 66 | 64 | 34 |
|   | 1% BF$_3$ · OEt$_2$ | DMF | 48 | 153 | 67 | 26 |
| 5 | 65% Fish Oil | CH$_2$Cl$_2$ | 24 | 40 | 73 | 25 |
|   | 20% Norbornadiene | THF | 48 | 66 | 60 | 38 |
|   | 10% Divinylbenzene | THF (thin film) | 48 | 66 | 67 | 28 |
|   | 5% BF$_3$ · OEt$_2$ | DMF | 48 | 153 | 75 | 17 |
| 6 | 65% Conjugated Fish Oil | CH$_2$Cl$_2$ | 24 | 40 | 79 | 17 |
|   | 20% Norbornadiene | THF | 48 | 66 | 75 | 23 |
|   | 10% Divinylbenzene | DMF | 24 | 153 | 83 | 15 |
|   | 5% BF$_3$ · OEt$_2$ | | | | | |
| 7 | 50% Conjugated Fish Oil | CH$_2$Cl$_2$ | 24 | 40 | 86 | 10 |
|   | 30% Norbornadiene | THF | 48 | 66 | 84 | 16 |
|   | 15% Divinylbenzene | DMF | 48 | 153 | 77 | 15 |
|   | 5% BF$_3$ · OEt$_2$ | | | | | |
| 8 | 89% Conjugated Fish Oil | CH$_2$Cl$_2$ | 24 | 40 | 68 | 26 |
|   | 5% Norbornadiene | THF | 48 | 66 | 66 | 33 |
|   | 5% Divinylbenzene | DMF | 48 | 153 | 70 | 29 |
|   | 1% BF$_3$ · OEt$_2$ | | | | | |
| 9 | 65% Fish Oil | CH$_2$Cl$_2$ | 24 | 40 | 52 | 47 |
|   | 20% Dicyclopentadiene | THF | 48 | 66 | 49 | 47 |
|   | 10% Divinylbenzene | DMF | 48 | 153 | 56 | 35 |
|   | 5% BF$_3$ · OEt$_2$ | | | | | |
| 10 | 65% Conjugated Fish Oil | CH$_2$Cl$_2$ | 24 | 40 | 75 | 17 |
|   | 20% Dicyclopentadiene | THF | 48 | 66 | 74 | 23 |
|   | 10% Divinylbenzene | DMF | 48 | 153 | 82 | 13 |
|   | 5% BF$_3$ · OEt$_2$ | | | | | |
| 11 | 65% Conjugated Fish Oil | CH$_2$Cl$_2$ | 24 | 40 | 81 | 15 |
|   | 20% Norbornadiene | THF | 72 | 66 | 79 | 21 |
|   | 10% Divinylbenzene | | | | | |
|   | 5% BF$_3$ · OEt$_2$ | | | | | |
|   | (110° C. for 5 d) | | | | | |

TABLE 25

Thermogravimetric Analysis of the Insoluble Material Remaining After Soxhlet Extraction of Fish Oil Polymers

| Entry | Polymer | TGA[a] | | | |
|---|---|---|---|---|---|
| | | $T_{N2}$ (° C.) (5%) | $T_{N2}$ (° C.) (10%) | $T_{air}$ (° C.) (5%) | $T_{air}$ (° C.) (10%) |
| 1 | 65% Norway Fish Oil | | | | |
|   | 30% Divinylbenzene | | | | |
|   | 5% BF$_3$ · OEt$_2$ | | | | |
|   | CH$_2$Cl$_2$ Insolubles | 424 | 445 | 408 | 436 |
|   | THF Insolubles | 439 | 456 | 420 | 442 |
| 2 | 65% Conjugated Norway Fish Oil | | | | |
|   | 30% Divinylbenzene | | | | |
|   | 5% BF$_3$ · OEt$_2$ | | | | |
|   | CH$_2$Cl$_2$ Insolubles | 421 | 438 | 385 | 405 |
|   | THF Insolubles | 420 | 436 | 370 | 389 |
| 3 | 85% Conjugated Norway Fish Oil | | | | |
|   | 10% Divinylbenzene | | | | |
|   | 5% BF$_3$ · OEt$_2$ | | | | |
|   | CH$_2$Cl$_2$ Insolubles | 395 | 418 | 357 | 382 |
|   | THF Insolubles | 402 | 422 | 367 | 387 |
| 4 | 94% Conjugated Norway Fish Oil | | | | |
|   | 5% Divinylbenzene | | | | |
|   | 1% BF$_3$ · OEt$_2$ | | | | |

TABLE 25-continued

Thermogravimetric Analysis of the Insoluble Material Remaining After Soxhlet Extraction of Fish Oil Polymers

| Entry | Polymer | TGA[a] | | | |
|---|---|---|---|---|---|
| | | $T_{N2}$ (° C.) (5%) | $T_{N2}$ (° C.) (10%) | $T_{air}$ (° C.) (5%) | $T_{air}$ (° C.) (10%) |
| | CH$_2$Cl$_2$ Insolubles | 400 | 423 | 366 | 393 |
| | THF Insolubles | 406 | 427 | 371 | 396 |
| 5 | 65% Norway Fish Oil 20% Norbornadiene 10% Divinylbenzene 5% BF$_3$ · OEt$_2$ | | | | |
| | CH$_2$Cl$_2$ Insolubles | 391 | 426 | 372 | 410 |
| | THF Insolubles | 414 | 432 | 373 | 396 |
| 6 | 65% Conjugated Norway Fish Oil 20% Norbornadiene 10% Divinylbenzene 5% BF$_3$ · OEt$_2$ | | | | |
| | CH$_2$Cl$_2$ Insolubles | 360 | 401 | 354 | 413 |
| | THF Insolubles | 345 | 373 | 333 | 358 |
| 7 | 50% Conjugated Norway Fish Oil 30% Norbornadiene 15% Divinylbenzene 5% BF$_3$ · OEt$_2$ | | | | |
| | CH$_2$Cl$_2$ Insolubles | 361 | 402 | 334 | 394 |
| | THF Insolubles | 358 | 386 | 338 | 371 |
| 8 | 89% Conjugated Norway Fish Oil 5% Norbornadiene 5% Divinylbenzene 1% BF$_3$ · OEt$_2$ | | | | |
| | CH$_2$Cl$_2$ Insolubles | 407 | 432 | 385 | 424 |
| | THF Insolubles | 403 | 427 | 385 | 415 |
| 9 | 65% Norway Fish Oil 20% Dicyclopentadiene 10% Divinylbenzene 5% BF$_3$ · OEt$_2$ | | | | |
| | CH$_2$Cl$_2$ Insolubles | 414 | 445 | 415 | 448 |
| | THF Insolubles | 412 | 433 | 369 | 392 |
| 10 | 65% Conjugated Norway Fish Oil 20% Dicyclopentadiene 10% Divinylbenzene 5% BF$_3$ · OEt$_2$ | | | | |
| | CH$_2$Cl$_2$ Insolubles | 415 | 438 | 391 | 417 |
| | THF Insolubles | 418 | 438 | 397 | 421 |
| 11 | 65% Conjugated Capelin Fish Oil 30% Divinylbenzene 5% BF$_3$ · OEt$_2$ | | | | |
| | CH$_2$Cl$_2$ Insolubles | 188 | 351 | 188 | 329 |
| 12 | 65% Conjugated Capelin Fish Oil 20% Norbornadiene 10% Divinylbenzene 5% BF$_3$ · OEt$_2$ | | | | |
| | CH$_2$Cl$_2$ Insolubles | 273 | 366 | 270 | 345 |

[a]The TGA temperature ramp used was 20° C./min.

The above description and examples are only illustrative of preferred embodiments which achieve the objects, features and advantages of the present invention. It is not intended that the present invention be limited to the illustrated embodiments. Any modification of the present invention which comes within the spirit and scope of the following claims should be considered part of the present invention.

What is claimed as new and desired to be protected by Letters Patent of the United States is:

1. A method for making a biological oil plastic by Lewis-acid catalyzed polymerization, comprising
    obtaining a biological oil containing an unsaturated fatty acid ester;
    conjugating the biological oil with a rhodium catalyst;
    mixing the biological oil with a Lewis-acid catalyst to produce an oil-catalyst mixture; and
    subjecting the oil-catalyst mixture to a temperature within the range of about 10° C. to about 125° C. for about 22 to about 96 hours to form a polymerized biological oil.

2. The method of claim 1 wherein said Lewis-acid catalyst is BF$_3$. OEt$_2$.

3. The method of claim 1 wherein said biological oil is soybean oil.

4. The method of claim 1 wherein said biological oil is fish oil.

5. The method of claim 1 wherein said biological oil comprises a mixture of soybean oil and fish oil.

6. The method of claim 1 wherein said temperature is from about 60 to about 110° C.

7. The method of claim 1 wherein said time is about 1 to about 4 days.

8. The method of claim 1 wherein said conjugating step comprises use of a rhodium catalyst selected from the group consisting of $RhCl(PPh_3)_3$ and $[RhCl(C_8H_{14})_2]_2$.

9. The method of claim 1 further comprising the step of mixing said biological oil with at least one comonomer.

10. The method of claim 9 wherein said at least one comonomer is selected from the group consisting of divinylbenzene, norbornadiene, dicyclopentadiene, styrene, α-methystyrene, furfural, p-benzoquinone, p-mentha-1,8-diene, and furan.

11. A method for making a biological oil plastic by Lewis-acid catalyzed polymerization, comprising:
    obtaining a biological oil containing an unsaturated fatty acid ester;
    mixing the biological oil with a ruthenium catalyst in a reduced oxygen atmosphere to produce a biological oil-ruthenium catalyst mixture; and
    subjecting the biological oil-ruthenium catalyst mixture to a temperature within a range of about 20° C. to about 250° C. for about 3 to about 192 hours to form a reaction mixture containing a metathesized product;
    mixing the metathesized product with a Lewis-acid catalyst to produce an oil-catalyst mixture; and
    subjecting the oil-catalyst mixture to a temperature within the range of about 10° C. to about 125° C. for about 22 to about 96 hours to form a polymerized biological oil.

12. The method of claim 11, wherein the ruthenium catalyst is a ruthenium complex of the formula $RCH=RuR'_2(R''_3P)_2$, where R is an alkyl, aryl or vinylic group, R' is a halogen, and R'' is a phenyl or cyclohexyl group.

13. The method of claim 11, wherein the ruthenium catalyst is $PhCH=RuCl_2(CY_3P)_2$, where Ph is a phenyl group and Cy is a cyclohexyl group.

14. The method of claim 11, wherein the ruthenium catalyst is bis(tricyclohexylphosphine)benzylidene ruthenium dichloride.

15. The method of claim 11 wherein said step of metathesizing said biological oil comprises cometathesization of said biological oil with an alkene.

16. The method of claim 15 wherein said alkene is norbornadiene.

17. The method of claim 1 further comprising the step of epoxidizing said biological oil prior to mixing said biological oil with said catalyst.

18. The method of claim 10 wherein said at least one comonomer is added in an amount in the range of about 5% to about 35% by weight of said reaction mixture.

19. The method of claim 18 wherein said at least one comonomer is selected from the group consisting of divinylbenzene, norbornadiene and dicyclopentadiene.

20. The method of claim 18 wherein said at least one comonomer is divinylbenzene.

21. The method of claim 20 wherein said at least one comonomer further comprises norbornadiene.

22. The method of claim 20 wherein said at least one comonomer further comprises dicyclopentadiene.

23. A method of making a thermoset plastic, comprising:
    obtaining a biological oil selected from the group consisting of fish oil and soybean oil;
    mixing said biological oil with a comonomer selected from the group consisting of divinylbenzene, norbornadiene, dicyclopentadiene, styrene, alpha-methylstyrene, furfural, p-benzoquinone, p-mentha-1,8-diene, and furan to form a biological oil-comonomer mixture;
    mixing said biological oil-comonomer mixture with about 1 to 7% by weight of a $BF_3.OEt_2$ catalyst to produce an oil-catalyst mixture; and
    subjecting the oil-catalyst mixture to a temperature within the range of about 10° C. to about 125° C. for about 22 to about 96 hours to form a hard thermoset plastic.

24. The method of claim 23 wherein said thermoset plastic losses about 5% of its weight at about 200° C. to about 270° C. and losses about 10% of its weight at about 250° C. to about 330° C. as determined by thermogravimetric analysis.

25. The method of claim 23 wherein said thermoset plastic has a glass transition temperature of between about 50° C. and 130° C.

26. The method of claim 23 wherein said thermoset plastic has a modulus at room temperature of about $1 \times 10^8$ to about $1 \times 10^9$ Pa.

27. The method of claim 23 wherein at least a portion of said thermoset plastic is insoluble in a compound selected from the group consisting of tetrahydrofuran, $CH_2Cl_2$ and dimethylformamide.

28. The method of claim 27 wherein said insoluble portion losses about 5% of its weight at about 350° C. to about 375° C. and losses about 10% of its weight at about 420° C. as determined by thermogravimetric analysis.

29. A method of making a thermoset plastic, comprising:
    obtaining a biological oil selected from the group consisting of fish oil and soybean oil;
    conjugating said biological oil by use of a rhodium catalyst selected from the group consisting of $RhCl(PPh_3)_3$, $[RhCl(C_8H_{14})_2]_2$, $[RhCl(C_2H_4)_2]_2$;
    mixing the conjugated biological oil with the Lewis-acid catalyst $BF_3.OEt_2$ to produce an oil-catalyst mixture; and
    subjecting the oil-catalyst mixture to a temperature within the range of about 10° C. to about 125° C. for about 22 to about 96 hours to form a hard thermoset plastic.

30. The method of claim 29 wherein said thermoset plastic has a glass transition temperature of between about 50° C. and 130° C.

31. The method of claim 29 wherein said thermoset plastic has a modulus at room temperature of about $1 \times 10^8$ to about $1 \times 10^9$ Pa.

32. The method of claim 29 wherein said plastic losses about 5% of its weight at about 200° C. to about 270° C. and losses about 10% of its weight at about 250° C. to about 330° C. as determined by thermogravimetric analysis.

33. The method of claim 29 wherein at least a portion of said thermoset plastic is insoluble in a compound selected from the group consisting of tetrahydrofuran, $CH_2Cl_2$ and dimethylformamide.

34. The method of claim 33 wherein said insoluble portion losses about 5% of its weight at about 350° C. to about 375° C. and losses about 10% of its weight at about 420° C. as determined by thermogravimetric analysis.

35. The method of claim 29 wherein said conjugating step is carried out in the presence of EtOH.

36. The method of claim 29 wherein said conjugating step is carried out in the presence of a Lewis-acid.

37. The method of claim 36 wherein said Lewis-acid is $SnCl_2 \cdot 2H_2O$.

38. The method of claim 29 wherein said conjugating step is carried out in the presence of a phosphine ligand.

39. The method of claim 29 wherein said conjugating step is carried out using a $[RhCl(C_8H_{14})_2]_2$ catalyst, $SnCl_2 \cdot 2H_2O$ and $(p-CH_3C_6H_4)_3P$.

40. The method of claim 29 further comprising the step of mixing said conjugated biological oil with at least one comonomer.

41. The method of claim 40 wherein said at least one comonomer is selected from the group consisting of divinylbenzene, norbornadiene, dicyclopentadiene, styrene, α-methylstyrene, furfural, p-benzoquinone, p-mentha-1,8-diene, and furan.

42. A method of making a thermoset plastic, comprising:
  obtaining a biological oil selected from the group consisting of fish oil and soybean oil;
  mixing the biological oil with a ruthenium catalyst in a reduced oxygen atmosphere to produce a biological oil-ruthenium catalyst mixture;
  subjecting the biological oil-ruthenium catalyst mixture to a temperature within a range of about 20° C. to about 250° C. for about 3 to about 192 hours to form a reaction mixture containing a metathesized product;
  mixing the metathesized product with the Lewis-acid catalyst $BF3 \cdot OEt_2$ to produce a metathesized product-catalyst mixture; and
  subjecting the metathesized product-catalyst mixture to a temperature within the range of about 10° C. to about 125° C. for about 22 to about 96 hours to form a hard thermoset plastic.

43. The method of claim 42 wherein said thermoset plastic losses about 5% of its weight at about 200° C. to about 270° C. and losses about 10% of its weight at about 250° C. to about 330° C. as determined by thermogravimetric analysis.

44. The method of claim 42 wherein said thermoset plastic has a glass transition temperature of between about 50° C. and 130° C.

45. The method of claim 42 wherein said thermoset plastic has a modulus at room temperature of about $1 \times 10^8$ to about $1 \times 10^9$ Pa.

46. The method of claim 42 wherein at least a portion of said plastic is insoluble in a compound selected from the group consisting of tetrahydrofuran, $CH_2Cl_2$ and dimethylformamide.

47. The method of claim 46 wherein said insoluble portion losses about 5% of its weight at about 350° C. to about 375° C. and losses about 10% of its weight at about 420° C. as determined by thermogravimetric analysis.

48. The method of claim 42, wherein the ruthenium catalyst is a ruthenium complex of the formula $RCH=RuR'_2(R''_3P)_2$, where R is an alkyl, aryl or vinylic group, R' is a halogen, and R'' is a phenyl or cyclohexyl group.

49. The method of claim 42, wherein the ruthenium catalyst is $PhCH=RuCl_2(Cy_3P)_2$, where Ph is a phenyl group and Cy is a cyclohexyl group.

50. The method of claim 42, wherein the ruthenium catalyst is bis(tricyclohexylphosphine)benzylidene ruthenium dichloride.

51. The method of claim 42 further comprising the step of mixing at least one comonomer with said metathesized product prior to mixing said product with said catalyst.

52. The method of claim 51 wherein said at least one comonomer is selected from the group consisting of divinylbenzene, norbornadiene, dicyclopentadiene, styrene, α-methylstyrene, furfural, p-benzoquinone, p-mentha-1,8-diene, and furan.

53. The method of claim 42 wherein said metathesized product is a soy or fish oil cometathesized with norbornadiene.

54. The method of claim 10 wherein said at least one comonomer is selected from the group consisting of divinylbenzene, norbornadiene, dicyclopentadiene and styrene.

55. The method of claim 54 wherein said at least one comonomer is styrene.

56. The method of claim 41 wherein said at least one comonomer is selected from the group consisting of divinylbenzene, norbornadiene, dicyclopentadiene and styrene.

57. The method of claim 52 wherein said at least one comonomer is selected from the group consisting of divinylbenzene, norbornadiene, dicyclopentadiene and styrene.

58. The method of claim 57 wherein said at least one comonomer is styrene.

* * * * *